United States Patent
Leather et al.

(10) Patent No.: US 11,742,961 B2
(45) Date of Patent: *Aug. 29, 2023

(54) NETWORK DEVICE FOR USE IN A WIRELESS COMMUNICATION NETWORK AND AN END-TO-END OVER-THE-AIR TEST AND MEASUREMENT SYSTEM FOR ONE OR MORE NETWORK DEVICES

(71) Applicant: Fraunhofer-Gesellschaft zur Förderung der angewandten Forschung e.V., Munich (DE)

(72) Inventors: Paul Simon Holt Leather, Berlin (DE); Thomas Haustein, Potsdam (DE); Kei Sakaguchi, Berlin (DE); Ramez Askar, Berlin (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,492

(22) Filed: Dec. 8, 2021

(65) Prior Publication Data

US 2022/0103266 A1 Mar. 31, 2022

Related U.S. Application Data

(63) Continuation of application No. 16/700,155, filed on Dec. 2, 2019, now Pat. No. 11,233,584, which is a (Continued)

(30) Foreign Application Priority Data

May 31, 2017 (EP) .................................... 17173811

(51) Int. Cl.
H04B 17/00 (2015.01)
H04B 17/10 (2015.01)
H04B 17/11 (2015.01)

(52) U.S. Cl.
CPC ....... H04B 17/104 (2015.01); H04B 17/0085 (2013.01); H04B 17/0087 (2013.01); H04B 17/11 (2015.01)

(58) Field of Classification Search
CPC .. H04B 17/104; H04B 17/11; H04B 17/0085; H04B 17/0087; H04W 24/00; H04W 24/02

See application file for complete search history.

(56) References Cited

U.S. PATENT DOCUMENTS 6,122,505 A 9/2000 Genell et al.
7,937,063 B1 5/2011 Rausch et al.
(Continued)

FOREIGN PATENT DOCUMENTS

CN 101558578 A 10/2009
CN 102461051 A 5/2012
(Continued)

OTHER PUBLICATIONS

M. Kottkamp et al., "Antenna Array Testing—Conducted and Over the Air: The Way to 5G," Nov. 2016.
(Continued)

*Primary Examiner* — Tuan Pham
(74) *Attorney, Agent, or Firm* — NKL Law; Jae Youn Kim

(57) ABSTRACT

Among network devices for use within a wireless communication network, a transmitting network device is configured to transmit to a receiving network device via a control channel one or more control signals for configuring the receiving network device for a characterization of at least
(Continued)

one of the transmitting network device and the receiving network device and/or for a characterization of one or more communication channels between the transmitting network device and the receiving network device.

45 Claims, 13 Drawing Sheets

Related U.S. Application Data continuation of application No. PCT/EP2018/064292, filed on May 30, 2018.

(56) References Cited

U.S. PATENT DOCUMENTS

| | | | | |
|---|---|---|---|---|
| 9,209,914 | B2* | 12/2015 | Reed | H04B 17/0085 |
| 9,520,977 | B2 | 12/2016 | Leng et al. | |
| 9,924,386 | B2* | 3/2018 | Jain | H04L 41/5032 |
| 11,233,584 | B2* | 1/2022 | Leather | H04B 17/309 |
| 2006/0055592 | A1 | 3/2006 | Leather et al. | |
| 2010/0214990 | A1 | 8/2010 | Fukui | |
| 2011/0038305 | A1 | 2/2011 | Mella et al. | |
| 2012/0093104 | A1 | 4/2012 | Tiirola et al. | |
| 2012/0214504 | A1 | 8/2012 | Zha et al. | |
| 2014/0317176 | A1 | 10/2014 | Luecke et al. | |
| 2015/0025818 | A1* | 1/2015 | Das | H04W 24/10 702/58 |
| 2015/0351104 | A1 | 12/2015 | Sagae et al. | |
| 2016/0113033 | A1 | 4/2016 | Pasad et al. | |
| 2016/0359718 | A1 | 12/2016 | Banerjee et al. | |

FOREIGN PATENT DOCUMENTS

| | | |
|---|---|---|
| WO | 2006047677 A1 | 5/2006 |
| WO | 2016195//1 A1 | 12/2016 |

OTHER PUBLICATIONS

R. K. Sharma et al., "Over-the-Air Testing of Cognitive Radio Nodes in a Virtual Electromagnetic Environment," International Journal of Antennas and Propagation, vol. vol. 2013, No. Article ID 945283, pp. 1-16, 2013.

Intel Corporation: "Testability considerations for NR" 3GPP Draft, R4-165050 NR Testability, 3rd generation partnership Project 3GPP, 2016, XP051127827.

3GPP Technical Report TR 22.819, "Technical Specification Group Services and System Aspects, Feasibility Study on Maritime Communication Services over 3GPP system, Stage 1, Release 16", May 2018.

3GPP Technical Report TR 38.811, "Technical Specification Group Radio Access Network, Study on New Radio (NR) to support non terrestrial networks, Release 15", Dec. 2017.

Lu Tong, "Office Action for CN Application No. 201880050544.5", Jun. 25, 2021, CNIPA, China.

3GPP TS 37.320, "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description;", Stage 2, Release 13, V13.1.0, Mar. 2016, Mar. 30, 2016, pp. 8-19.

Lu Tong, "Office Action for CN Application No. 201880050544.5". Mar. 30, 2022, CNIPA, China.

* cited by examiner

NETWORK DEVICE FOR USE IN A WIRELESS COMMUNICATION NETWORK AND AN END-TO-END OVER-THE-AIR TEST AND MEASUREMENT SYSTEM FOR ONE OR MORE NETWORK DEVICES

CROSS-REFERENCE TO RELATED APPLICATIONS

This application is a continuation of U.S. application Ser. No. 16/700,155, filed Dec. 2, 2019, which is incorporated herein by reference in its entirety, which in turn is a continuation of copending International Application No. PCT/EP2018/064292, filed May 30, 2018, which is incorporated herein by reference in its entirety, and additionally claims priority from European Application No. EP 17173811.5, filed May 31, 2017, which is incorporated herein by reference in its entirety.

The present invention concerns a network device for use in a wireless communication network which network device is configured to transmit one or more control signals to at least another network device, as well as to a network device for use in a wireless communication network which network device is configured to receive one or more control signals from at least another network device, and to an end-to-end over-the-air test and measurement system for one or more such network devices, in particular to an end-to-end over-the-air test and measurement system for combined antenna and radio systems.

BACKGROUND OF THE INVENTION

Such network devices may form part of a communication system (CS). Communication systems (CS) may be comprised of a variety of functional blocks which can be implemented in hardware and software or combinations of the two.

Hardware functions can be realized in many forms including networks, fixed and mobile equipment, circuits (discrete or integrated), modules, assemblies, sub-units, devices and components (passive or active). Examples of software functions include signal, image and other forms of information processing, hardware control, network management and so on.

During their various stages of development, design, production and assembly, both hardware and software functions are subject to different forms of testing including but not limited to functionality and performance measurements. Suitably-designed test and measurement (T&M) equipment and procedures are needed for such purposes.

After integration, sub-systems and systems comprised of functional blocks involve investigation at system-level to ensure that they operate correctly as a whole. Here system-level may mean, e.g., wireless transmission system but not an overall cellular system as it may commonly be used in the context of system-level simulations. In this sense, system-level may be more aligned to link-level (including, single link and multi-link) testing over all layers of the protocol stack.

Beyond this, when all functions of the communication system (CS) are integrated and connected together, a so-called end-to-end (E2E) assessment may be used in order to ensure overall operation. End-to-end in this context may mean, e.g., testing from similar stack levels (including application level) and from dissimilar stack levels.

The distinction between end-to-end (E2E) and system-level testing is now clear. This invention is concerned with the former, e.g. radiated or over-the-air (OTA) measurements.

E2E OTA measurements may allow the performance of a CS to be assessed according to real-world scenarios or use cases. Such assessments can be made in a laboratory environment or in situ e.g. in deployed networks—in other words before or after deployment, respectively. Indeed, in many situations, the final stages of CS design cannot proceed until deployment. This is often referred to as commissioning or system optimization.

However, even after this process has been completed, further E2E OTA measurements may be used for ensuring that a CS is operating correctly according to certain criteria not restricted to include, throughput, latency, coverage, capacity, reliability, security, and energy efficiency.

In view of the foregoing discussion and in order therefore to perform E2E OTA measurements, it is advantageous if the various component parts of the CS, their interfaces and the T&M equipment are appropriately equipped with the means to allow such test, measurements and procedures to be made.

However, no such universal E2E OTA T&M systems are known from from conventional technology. Only partial and therefore incomplete T&M solutions may be possible in conventional technology. For example [2] describes a layered approach in which a hierarchical propagation of control signals enables the measurement of devices in virtual electromagnetic environments. Such restrictions reduce the range of measurements that can be performed on highly-integrated communication systems.

The present invention therefore addresses the technical problems created by the short-comings of current T&M solutions and provides new types of measurements to be made that may not be possible in conventional technology. Furthermore, the inventive solution enables all OTA T&M entities to be appropriately configured without the need for a hierarchical or layered distribution of control information.

SUMMARY

An embodiment may have a network device for use within a wireless communication network, wherein the network device is configured to transmit to another network device via a control channel one or more control signals for configuring the another network device for a characterization of at least one of the network device and the another network device and/or for a characterization of one or more communication channels between the network device and the another network device.

Another embodiment may have a network device for use within a wireless communication network, wherein the network device is configured to receive from another network device via a control channel one or more control signals for configuring the network device for a characterization of at least one of the network device and the another network device and/or for a characterization of one or more communication channels between the network device and the another network device.

According to another embodiment, an Over-the-Air Test and Measurement System for one or more network devices within a wireless communication network may have: at least a first network device and at least a second network device, wherein the Over-the-Air Test and Measurement System is configured to provide a control channel between the first and the second network devices, and wherein at least the first network device is configured to transmit one or more control signals for controlling operation of a network device via said control channel to the second network device and/or to receive one or more control signals for controlling operation of a network device via said control channel from the second network device.

A first aspect of the invention concerns a network device for use in a wireless communication network, the network device having the features of claim 1. The network device is configured to transmit to another network device via a control channel one or more control signals. Thus, the network device of this first aspect may also be referred to as a transmitting network device. Since the another network device may receive said control signals, the another network device may also be referred to as a receiving network device. The one or more control signals may be exploited for configuring the receiving network device for a characterization of at least one of the transmitting network device and the receiving network device. Examples for said characterization of a network device may, for instance, be a determination of a certain characteristic such as, for instance, a certain behaviour of the network device within the network and/or a certain operation or action being performable by the network device and/or a certain mode or configuration in which the network device may operate, and many more. According to the invention, the control signals transmitted via the control channel may be used for configuring the receiving network device for such a characterization. That is, the receiving network device may be instructed by the control signals to perform the characterization of any network device, e.g. of the transmitting network device or even of itself. For example, the receiving network device may configure itself for operating in a certain way in order to perform the characterization, wherein said self-configuring may be based on the received control signals. In other words, one can say that operation of the receiving network device for performing a characterization may be controlled by means of the control signals exchanged via the control channel. The characterization of the network devices may be executed by performing, for example, tests and/or measurements in order to test and/or measure, for instance, a characteristic, e.g. a certain behaviour, a certain operation, a certain mode or the like of the network devices. That is, for example by testing a certain mode of a network device said network device may be characterized. As a further example, the network device may be characterized by measuring one or more characteristics of its radiated signals or the like. Such exemplary tests and/or measurements may be controlled by the receiving network itself or by the transmitting network device. In other words, both the transmitting network device and the receiving network device may take over control of a test and/or measurement or the like for performing a characterization. However, according to the inventive principle, the receiving network device configures itself for performing a test or the like based on (i.e. responsive to) the control signals. Thus, one could say that the transmitting network device may control operation of the receiving network device by means of the control signals exchanged via the control channel. Additionally or alternatively, the one or more control signals may be exploited for configuring the receiving network device for a characterization of one or more communication channels between the transmitting and the receiving network devices. Such communication channels may be wireless or wired communication channels. One non-exclusive example may be a wireless communication channel for mobile radio such as Long Term Evolution (LTE) or 5G. Said communication channels may, for instance, be characterized by measuring their bandwidth, availability, capacity and many more. According to the inventive principle, the receiving network device may be configured by means of the control signals to configure itself for, e.g. performing a channel quality measurement or the like for characterizing said wireless communication channel. The above mentioned examples for a characterization of a network device and/or a communication channel are non-limiting examples. According to the inventive concept the characterization may be performed responsive to the control signals which are transmitted from the transmitting network device to the receiving network device. Accordingly, the characterization (e.g. by performing tests and/or measurements) may be performed cooperatively between the transmitting and the receiving network devices. Furthermore, the inventive network devices may be used in deployed networks, wherein the network devices may be, for instance, base stations (BS), User Equipment (UE), Internet-of-Things (IoT) devices, Machine Type Communication (MTC) devices, or the like. In such cases, the inventive network devices may be tested in-situ, i.e. when they are used in deployed networks, wherein they are able to test themselves cooperatively by means of the inventive control channel. Additionally or alternatively, the network devices may be tested prior to being used in deployed networks, for example in various stages during manufacturing. In this case, the inventive network devices may be tested in testing environments comprising dedicated test equipment, such as so-called Test and Measurement Systems, anechoic chambers, non-anechoic chambers [3], measurement chambers or the like. As a non-limiting example, an inventive network device may be tested by such a Test and Measurement System, for example, in an anechoic chamber, wherein the network device may receive control signals from the Test and Measurement System via the inventive control channel. Thus, this Test and Measurement System, dedicated components thereof, chambers and the like may also be regarded as an inventive transmitting network device. Accordingly, inventive network devices may be tested in-situ in deployed networks and/or prior to being used in deployed networks, i.e. in pre-deployed network scenarios, wherein they are able to test themselves cooperatively by means of the inventive control channel.

A second aspect of the invention concerns a network device for use within a wireless communication network, the network device having the features of claim 25. The network device of the second aspect is configured to receive from another network device via a control channel one or more control signals. Thus, the network device of the second aspect may also be referred to as a receiving network device. Since the another network device of the second aspect may transmit said control signals, the another network device of the second aspect may also be referred to as a transmitting network device. The one or more control signals may be exploited for configuring the receiving network device for a characterization of at least one of the transmitting network device and the receiving network device and/or for a characterization of one or more communication channels between the receiving network device and the transmitting network device. Accordingly, the second aspect of the invention illuminates the above described examples of cooperative testing and the like from the perspective of a receiving network device. Thus, the examples and advantages as described above with respect to the first aspect also hold true for this second aspect. The network device of the second aspect may also be tested in deployed networks and/or in pre-deployed networks. As a non-limiting example, an inventive network device may be tested by a Test and Measurement System, for example, in an anechoic chamber, wherein the network device may transmit control signals to the Test and Measurement System via the inventive control channel. Thus, this Test and Measurement System, dedicated components thereof, chambers and the like may also be regarded as an inventive receiving network device. Accordingly, inventive network devices may be tested in-situ in deployed networks and/or prior to being used in deployed networks, i.e. in pre-deployed network scenarios, wherein they are able to test themselves cooperatively by means of the inventive control channel.

A third aspect of the invention concerns an Over-the-Air Test and Measurement System for one or more network devices within a wireless communication network, the Over-the-Air Test and Measurement System having the features of claim 42. According to the invention the Over-the-Air Test and Measurement System may comprise at least a first network device and at least a second network device. Depending on their configurations, the first network device may be a transmitting network device as described above while the second network device may then be a receiving network device as described above. Alternatively, the second network device may be a transmitting network device as described above, while the first network device may then be a receiving network device as described above. The inventive Over-the-Air Test and Measurement System may be configured to provide a control channel between the first and the second network devices, wherein at least the first network device may be configured to transmit to and/or receive from the second network device one or more control signals via said control channel. As mentioned above, the control signals may be exploited for controlling operation of a network device (i.e. of a transmitting network device and/or a receiving network device). Said operation may be, for example, a characterization (e.g. testing and/or measuring) of the receiving and/or transmitting network devices and/or of one or more communication channels between the first and the second network devices, as described exemplarily above. The inventive Over-the-Air Test and Measurement System may be used in-situ in deployed networks and/or in pre-deployed networks.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
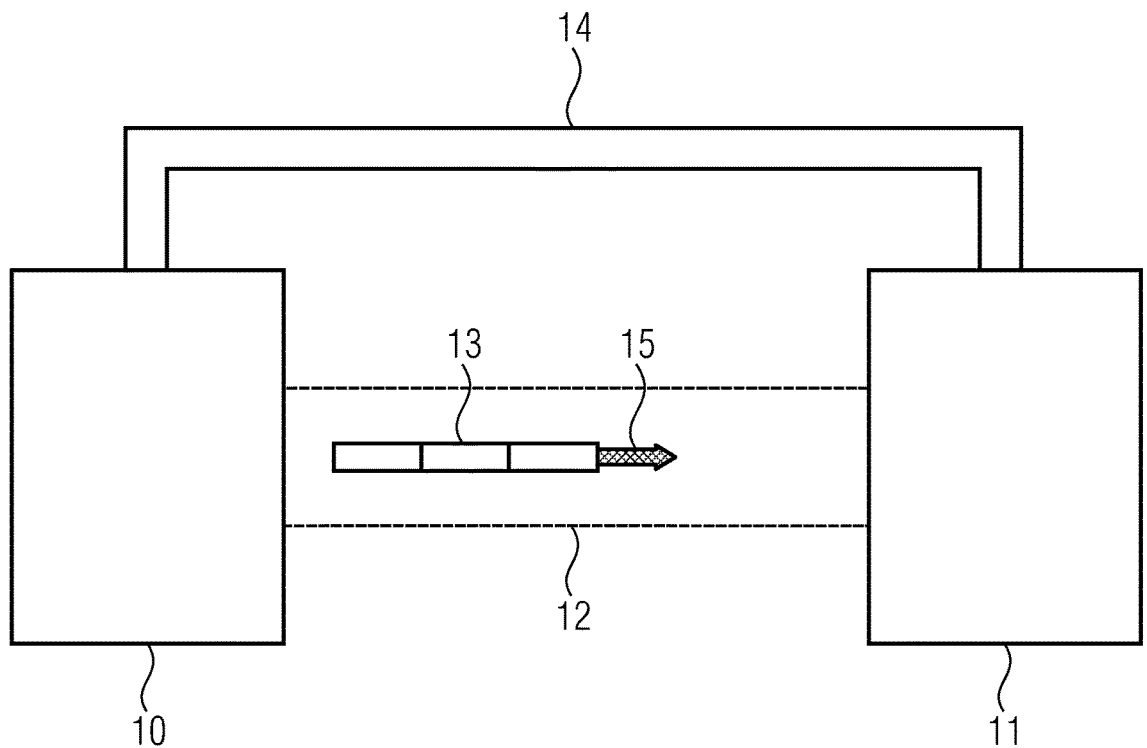
FIG. 1 shows an embodiment of network devices according to the invention.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

In the following, reference is made to a network device. Such a network device may comprise an antenna or an antenna array that may comprise a plurality of antennas and may be, e.g., an eMBB device, an Internet of Things (IoT) device, a Machine Type Communications (MTC) device, and/or a massive MIMO device which means a base station (eNB, gNB) or an apparatus operated thereby such as a user equipment (UE). Such devices may operate in mobile communication networks, for example, according to a Long Term evolution (LTE) standard, 5G or new radio. Before, during and after market introduction of such devices, tests may be performed so as to verify a compliance of the network device with respect to different requirements. Such a compliance to a certain test case may be tested, amongst other things, in view of a specific wireless communications standard and a behaviour in a wireless environment. This may include the ability to form specific beams with an antenna array, to use minimum and/or maximum transmission powers and/or to adapt to specific scenarios within a specific time. During such tests, a network device may be referred to as a tested device, i.e., a device under test (DuT). For testing the conformity with specifications, Test & Measurement (T&M) Systems may be used which may comprise sensors that may be configured to sense and/or evaluate emissions of the DuT. During tests, it may be desired or useful to change an operation of the DuT, e.g., to test different operating modes sequentially with one test set-up. Such operation may be indirectly controlled by hardware layers that may be connected to each other and may transmit control signals to other layers, wherein the behaviour of a source or destination layer may remain in-transparent for other layers, i.e., by simply changing an operation mode of the DuT it may remain unclear what exactly happens at an antenna array of the DuT. By using a control signal and/or a communication interface according to embodiments described herein, a direct control of the DuT may be achieved as it may be possible to control specific operation of the DuT aside the operation mode.

Furthermore, any of the inventive network devices as defined herein may be considered to represent, for example, an eNB or an UE, interchangeably. Additionally or alternatively, the inventive network devices may, for example, be test and measurement systems comprised of one or more pieces of T&M equipment, anechoic chambers and other types of chambers, which may also be combined with T&M equipment, or the like. In other words, the application herein is not limited to the use of a control channel in deployed networks only. It can also be used for the design, development, production, calibration, qualification, assessment and type approval of equipment before such apparatus is deployed, installed or used in a network. Thus, it is a further aspect of the invention to provide a Test and Measurement System that is capable of being configured as at least one of the network devices of the present invention as defined herein.

Before describing each individual embodiment of the present invention in detail with reference to the appended Figures, a brief introduction to T&M systems and related network devices/components according to the present invention, as well as an overview of the same, shall be given in the following for understanding the overall concept of the present invention. Therefore, the following sub-sections provide a detailed description of the various functions that comprise an E2E OTA T&M system according to the invention.

An inventive OTA T&M system for communication systems—including those comprised of active antenna systems (AAS)—may contain a number of component parts which can be categorized in various ways.

An AAS may include any antenna system that can be dynamically reconfigured in terms of its antenna performance including but not limited to the following, pattern, polarization, bandwidth, selectivity, sensitivity, in-band and out-of-band characteristics, multi-carrier support, agility, accuracy.

Figure 10:
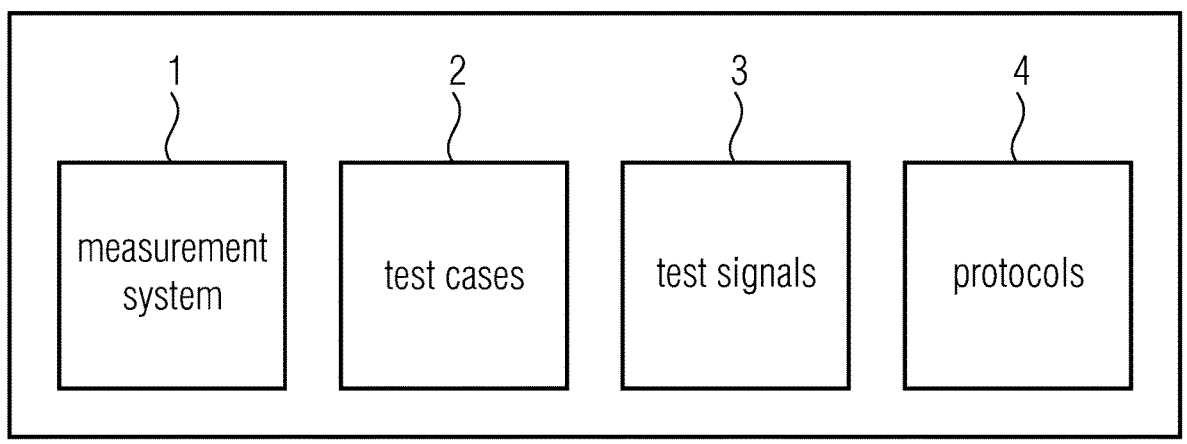
FIG. 10 shows functional blocks that may comprise an inventive over-the-air test and measurement system for communication and active antenna systems.

For example, an inventive OTA T&M system may be comprised of both hardware equipment and software code. Alternatively, the system can be described in terms of functionality as shown in FIG. 10. For example, the system may comprise a measurement system component 1, test case components 2, test signal components 3 and protocol components 4. A description of the functional components is given below.

Measurement Systems

An inventive measurement system 1 may comprise all hardware equipment, modules and components that may be used for performing the set or sets of measurements that may be used (including the appropriate procedures) on the CS and AAS (Active Antenna System) or indeed any other device under test (DUT). This may therefore include, e.g., electrical, mechanical, electromechanical, electromagnetic and electronic devices, examples of which may include antennas, positioners, turntables, shielded rooms, radiation absorbing material (RAM), electronic measurement equipment, cables and connectors.

The components that may provide such functionality may typically be coordinated by some form of automation controller. In addition to the former traditional definition of a measurement system, the inventive CS or AAS may itself per se be configured by various means to provide the functions that would normally be provided by a measurement system without of course interfering with the operation of the inventive CS or AAS unless when specially configured to do so.

Test Cases

To perform any measurement on a DUT, both it and the inventive T&M system may be configured according to the requirements of a specific test case (TC) to be measured. In the context of an inventive CS comprising an AAS, an example test case may involve certain beam patterns being configured which may then be measured over a given range of solid angles at given frequencies and for certain polarizations.

Test cases may allow beams to be assessed under different conditions including those designed for both verification and falsification criteria. An alternative set of test cases may be so designed to exercise the performance and operation of the network and the network component or components of the CS. Additional classes of test cases are described further below with reference to Virtual Electromagnetic Environments (VEEs) under the sub-header "Extensions of the inventive concept".

Test Signals

In addition to the basic description of any particular test case, both the inventive measurement equipment and the DUT shall have knowledge of a test signal that may be used for the purposes of either transmission or reception. Test signal design may therefore include waveforms with specific characteristics such as modulation, coding scheme, data pattern, bandwidth, peak-to-average power ratio (PAPR), and carrier aggregation (e.g. single component carrier (CC) or multiple component carriers). In addition, test signals shall also include the means to ensure synchronization, coordination and orchestration using, for example, time or frequency pilots.

Protocols

In order for a complete inventive OTA CS/AAS T&M system to function correctly, it may be advantageous for both the inventive T&M system and the DUT or a plurality of DUTs to be correctly and appropriately configured. This may be performed on the basis of an exchange of information between the two or more ends of the link that are, amongst other things, coordinated, orchestrated or otherwise appropriately configured. In general, and in order for the inventive T&M system to work with any suitably-enabled DUT, a clearly defined form of communication may be used or in other words, a protocol.

Figure 11:
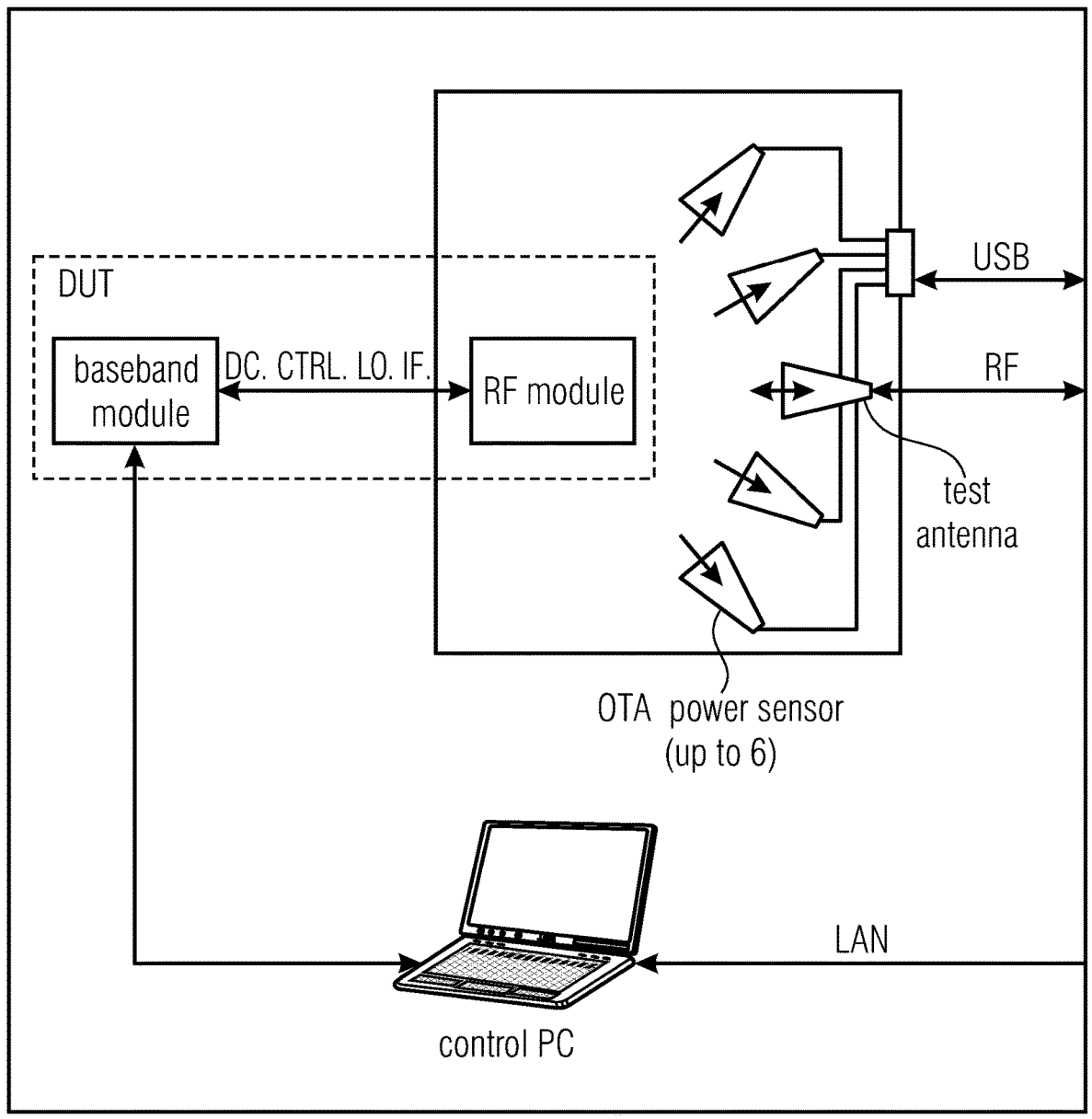
FIG. 11 shows a multi-probe power measurement solution of from conventional technology showing the need for protocol definition (after [1])

FIG. 11, which is taken from [2], illustrates the need for protocol definition in a commercially-available multi-probe system of from conventional technology. Additional protocols may also be provided for the internal configuration of the DUT to ensure the appropriate arrangement of, amongst other things, its RF front-end circuits (including signal routing) and its active antenna system (digital, analogue or hybrid combinations of the two).

Furthermore, a protocol can also be a procedure that ensures certain operations are performed in the order or sequence that may be used.

Protocols may also describe the format of the data that may be used for measurements, the method in which that data may be transported within the inventive T&M system and the various component parts of the inventive T&M system. Such descriptions may include both the internal interfaces of the inventive T&M system and the external connections to devices and other equipment that may reside outside of the inventive T&M system.

Extension of the Inventive Concept

Figure 12:
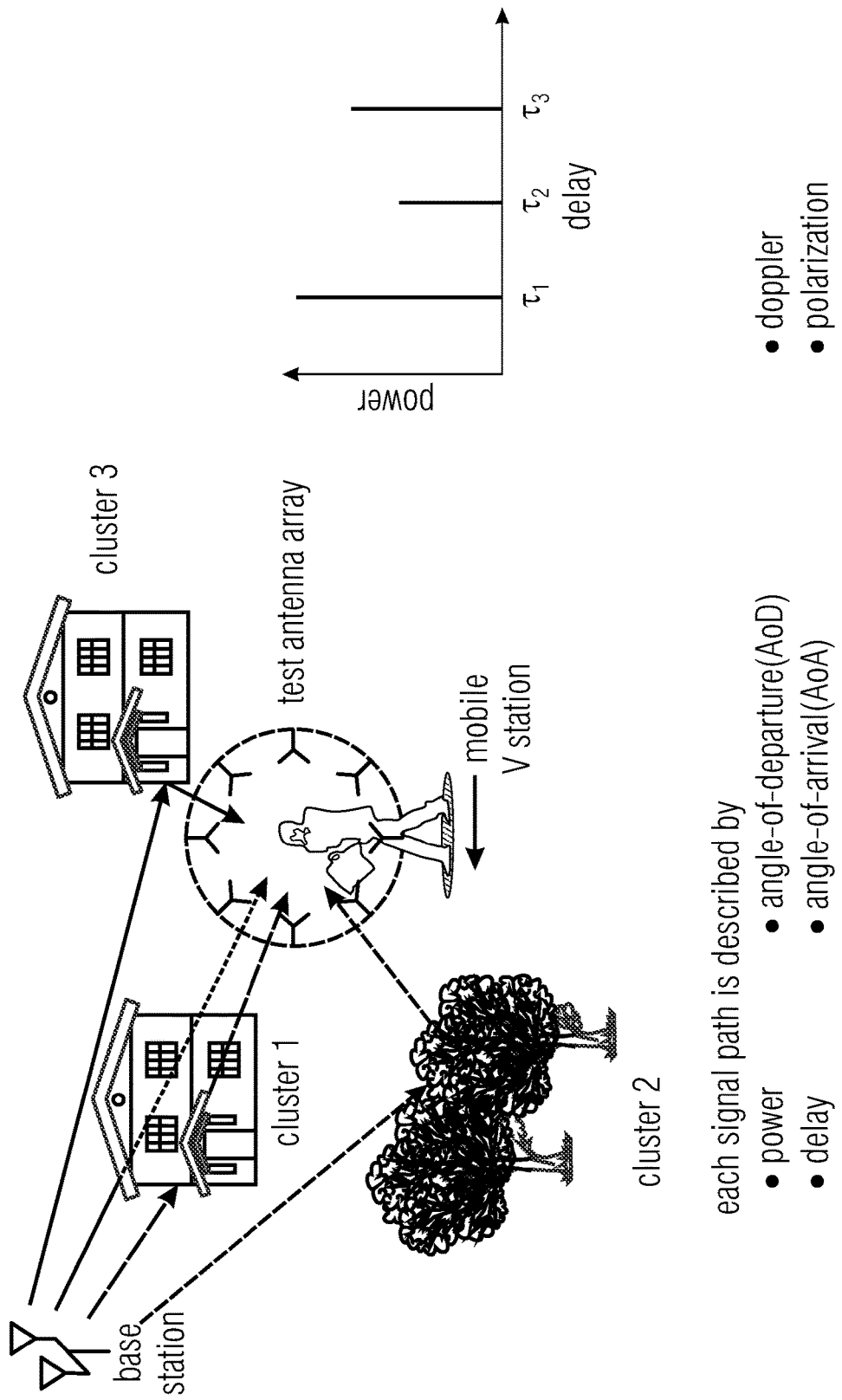
FIG. 12 shows a typical multipath scenario and parameters to be considered in OTA emulation in a virtual electromagnetic environment (OTAinVEE) according to from conventional technology (after [2])
Figure 13:
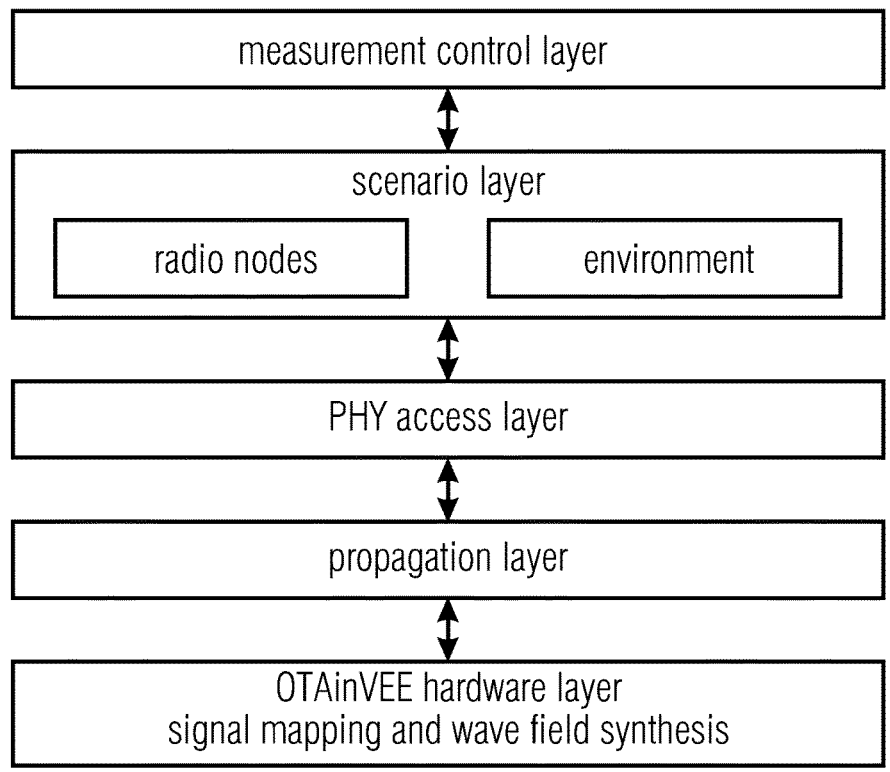
FIG. 13 shows a conventional-technology layered measurement procedure for OTA emulation in a virtual electromagnetic environment (OTAinVEE) (after [2])
Figure 14:
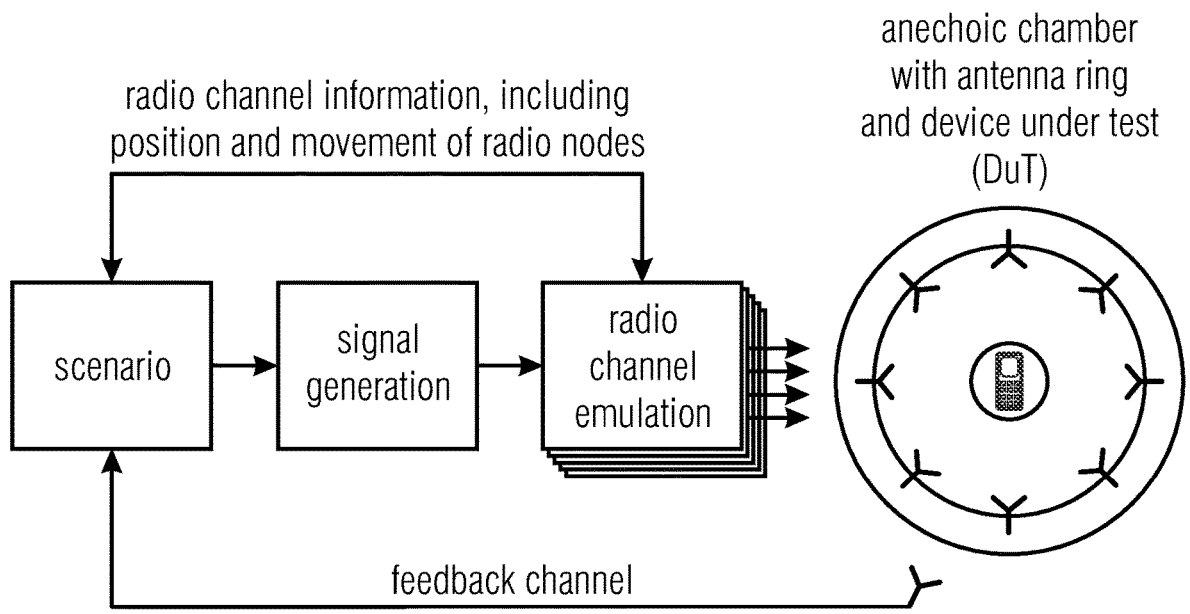
FIG. 14 shows a typical conventional-technology implementation of an OTAinVEE test setup for the single-user downlink scenario for mobile communication UE (after [2])

A fully-integrated inventive OTA CS/AAS T&M system may facilitate the means to perform testing in both traditional and extended measurement scenarios. The latter category may include so-called virtual electromagnetic environments (VEEs)—scenarios in which real-world propagation conditions are emulated within a measurement chamber. Graphical examples taken from open literature [2] are presented in FIGS. 12 to 14 in which the acronym OTAinVEE is introduced.

According to the invention, measurements may be made in anechoic and, through the use of advanced signal processing techniques, non-anechoic environments. The latter may involve an a priori knowledge of the test signal to be available to the system components that may be used (for example the inventive measurement equipment and the one or more DUTs), a requirement that is provided by definition of the present invention.

Furthermore, the extension of the inventive concept may be applied to scenarios in which OTA measurements are performed outside of a laboratory environment for example when the CS/AAS is deployed in a network. Here, combinations of appropriate test cases may enable post deployment measurements to be made in situ. This may be advantageous for initial commissioning, operations and maintenance purposes, calibration, optimization and the like. In circumstances when in situ antenna performance measurements are to be made, for example the determination of antenna-related parameters such as radiation pattern beam width, beam direction, and polarization and gain, the removal or reduction of the effects of unwanted multipath propagation may involve the use of the aforementioned signal processing techniques. This is comprehensible since—by definition—in situ measurements cannot be made in an anechoic environment.

In order to provide the means for an inventive OTA T&M system to establish and correct errors, problems, disturbances, disruptions, failures, outages or other unwanted effects, test cases can be designed to provide the means for autonomous and partly-autonomous OTA measurements and tests. Examples may include the activation of event or threshold-triggered procedures. Protocols having such predefined procedures may involve one or more entities or component parts which, in turn, may also trigger other entities to augment the measurement capabilities of the OTA T&M system.

A further extension of the inventive end-to-end OTA procedures may allow diagnostic test and measurement applications to be executed. Examples of such applications include the optimal selection of radio access network (RAN), mobile network operator (MNO), and quality of service (QOS). Execution of such inventive OTA tests and measurements may be made, in no order or priority, across network elements, layers, protocols and interfaces.

The inventive OTA T&M System may be configured to test and/or measure networks and network components. Such network components may be network nodes capable of communicating within the network, e.g. a base station, an User Equipment (UE), an Internet-of-Things (IoT) device. Furthermore, also the above mentioned inventive OTA Test and Measurement System may communicate with one or more devices within a network. The inventive OTA Test and Measurement System may comprise one or more pieces of T&M equipment, anechoic chambers and other types of chambers, which may also be combined with T&M equipment, or the like. Thus, all of the above mentioned devices may therefore be subsumed under the term network devices within this disclosure. The network may be a wireless communication network.

Networks Capable of being Used for the Inventive Concept

The (wireless communication) network that may be used in the inventive concept may be a terrestrial network, examples of which comprise mobile communication networks such as Wi-Fi, Bluetooth, ZigBee, LTE, 5G, New Radio and the like. A network device for use in such a terrestrial network may, for example, be a handheld device such as a smartphone, a generic mobile device such as a notebook, an Internet of Things (IoT) device, a generic stationary device such as a desktop computer, or any network devices being implemented in ground vehicles such as in cars, trains, bicycles and the like.

However, the present invention is not limited to terrestrial networks.

Figure 18:
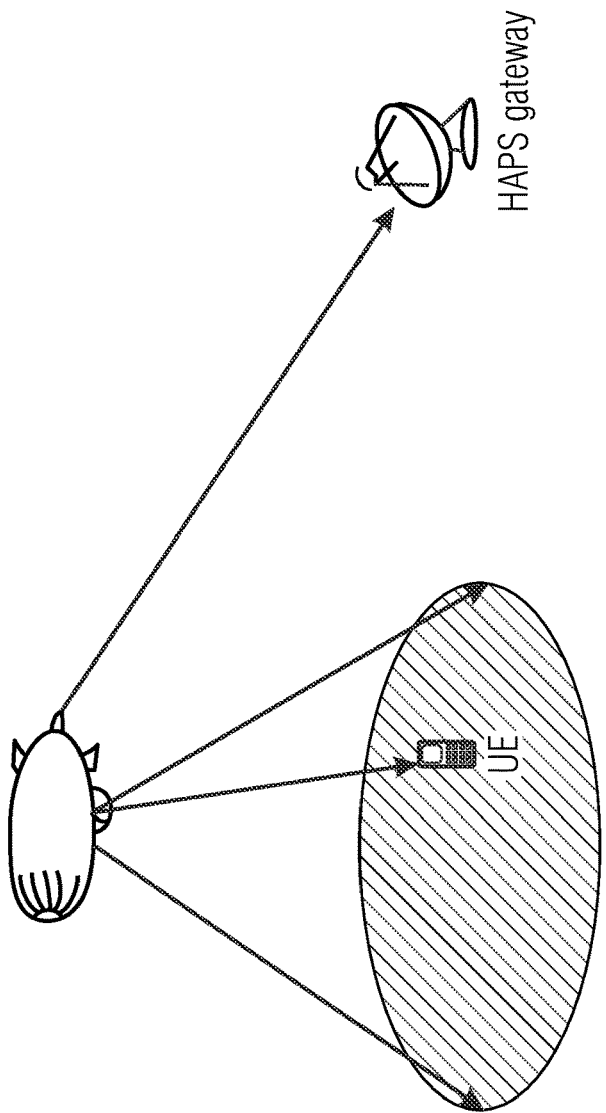
FIG. 18 shows a High-Altitude Platform Station (HAPS) system architecture (after [4])

Further (wireless communication) networks that may be employed in the present invention may comprise airborne networks that may be used, for instance, for wireless airborne communication with aircrafts such as airplanes, helicopters, drones, high-altitude platforms and the like [4]. FIG. 18 shows an example of a high-altitude platform station (HAPS) (wireless communications) network comprised of a user equipment (UE), a HAPS (wireless) satellite access network operating and a gateway.

Figure 15:
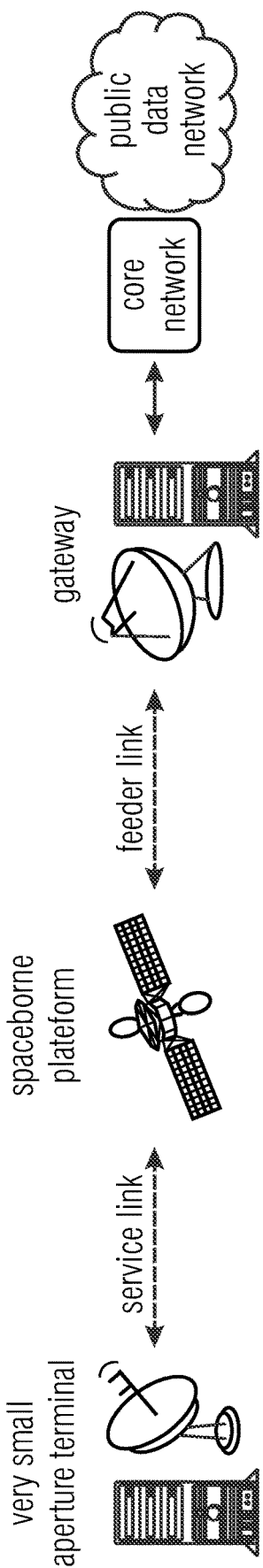
FIG. 15 shows a satellite access network (No ISL) which service link operates above 6 GHz frequency bands allocated to Fixed and Mobile Satellite Services (FSS and MSS) (after [4])
Figure 16:
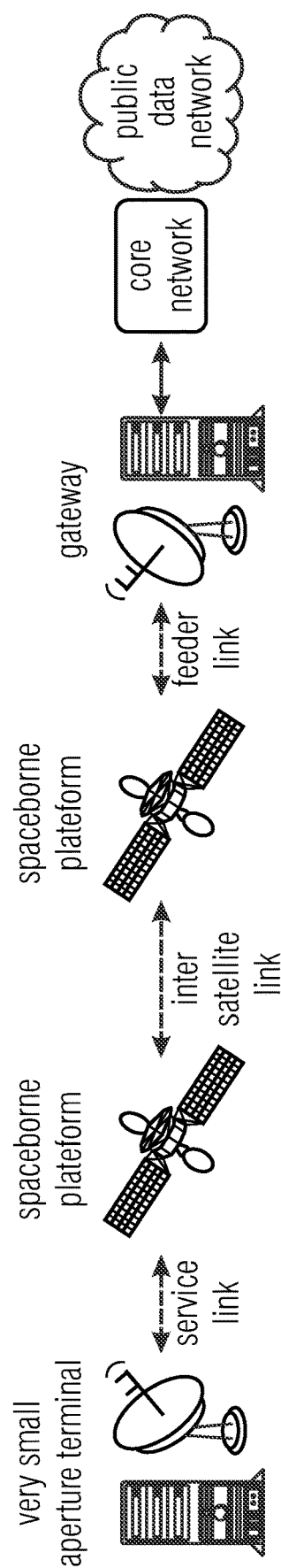
FIG. 16 shows a further satellite access network which service link operates above 6 GHz frequency bands allocated to Fixed and Mobile Satellite Services (FSS and MSS) (after [4])
Figure 17:
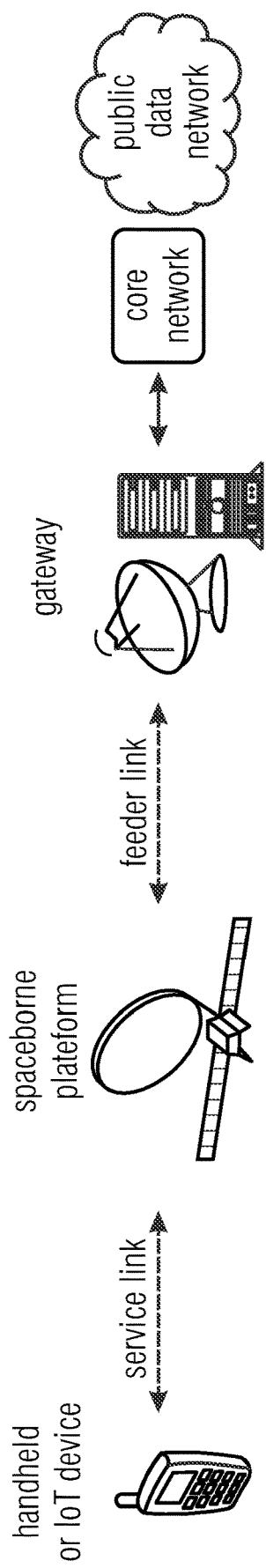
FIG. 17 shows a further satellite access network which service link operates below 6 GHz frequency bands allocated to Mobile Satellite Services (MSS) (after [4])

Further (wireless communication) networks that may be employed in the present invention may comprise extraterrestrial networks that may be used, for instance, for wireless extraterrestrial communication with satellites, spaceships, rockets and the like [4]. FIG. 15 shows an example of a (wireless communications) satellite access network operating above 6 GHz and comprised of fixed satellite services (FSS) and mobile satellite services (MSS). FIG. 16 shows a further example of a (wireless communications) satellite access network operating above 6 GHz and comprised of an inter-satellite link, fixed satellite services (FSS) and mobile satellite services (MSS). FIG. 17 shows a further example of a (wireless communications) satellite access network operating below 6 GHz and comprised of mobile satellite services (MSS).

Figure 19:
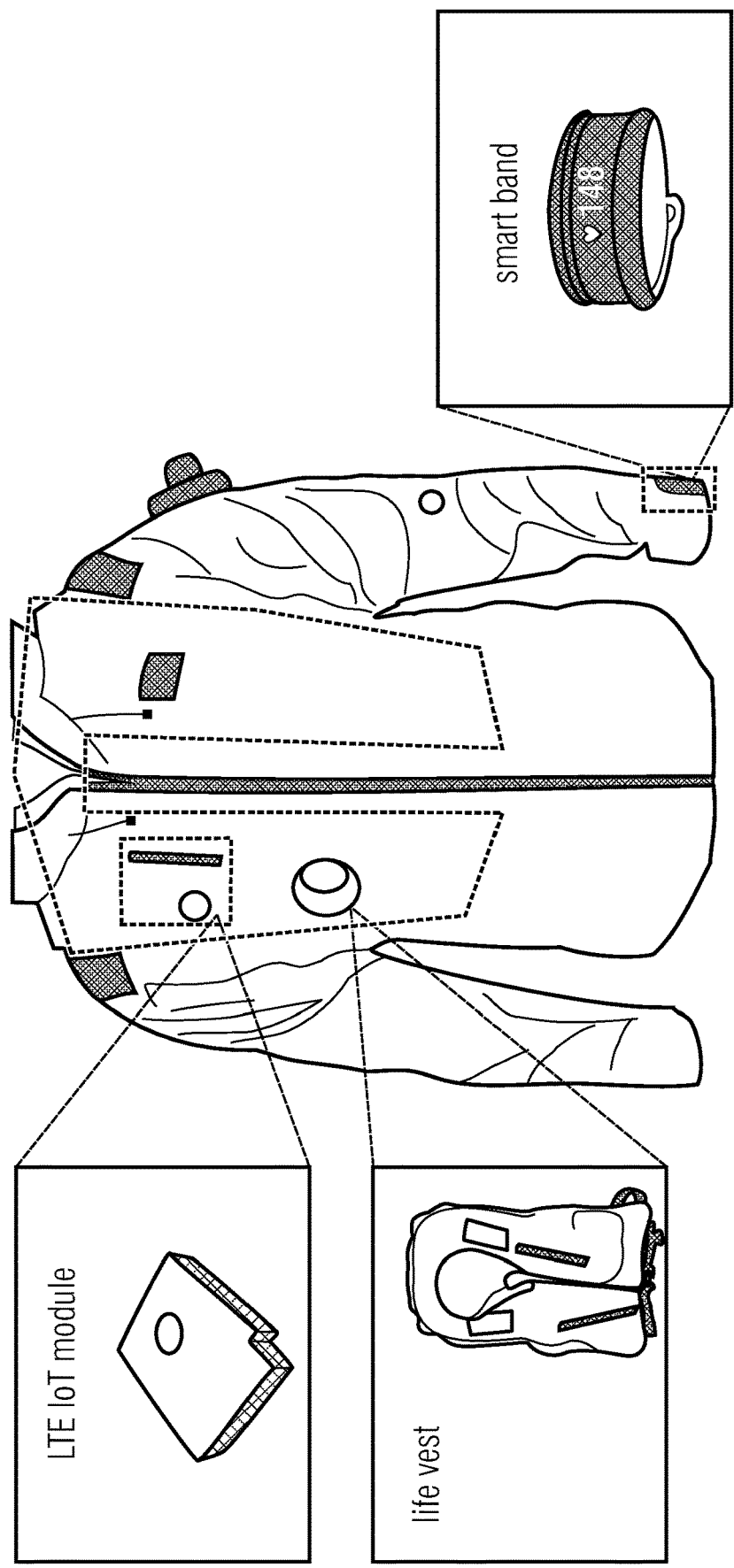
FIG. 19 shows examples of wearable IoT-Devices (after [5])

Further (wireless communication) networks that may be employed in the present invention may comprise maritime networks that may be used, for instance, for wireless maritime communication with swimmers, divers, rescue equipment, IoT devices, marine sensors, meteorological devices, off-shore platforms, maritime navigation devices, ships, boats or other craft [5]. FIG. 19 shows an example of wearable Internet of Things (IoT) devices including: clothing fitted with an LTE IoT module, a life vest equipped with an IoT device, and a wrist band or smart band enabled with IoT functionalitiy.

Further (wireless communication) networks that may be employed in the present invention may comprise networks that may be used, for instance, for wireless communication within ships or boats.

Further (wireless communication) networks that may be employed in the present invention may comprise underwater networks that may be used, for instance, for wireless communication with swimmers, divers, submarines, submersed vehicles, underwater equipment, rescue equipment, IoT devices, marine sensors, meteorological devices, off-shore platforms, maritime navigation devices, ships, boats or other craft.

Further (wireless communication) networks that may be employed in the present invention may comprise underwater segments that are used to provide interconnections to land segments and/or other non-underwater segments.

Figure 20:
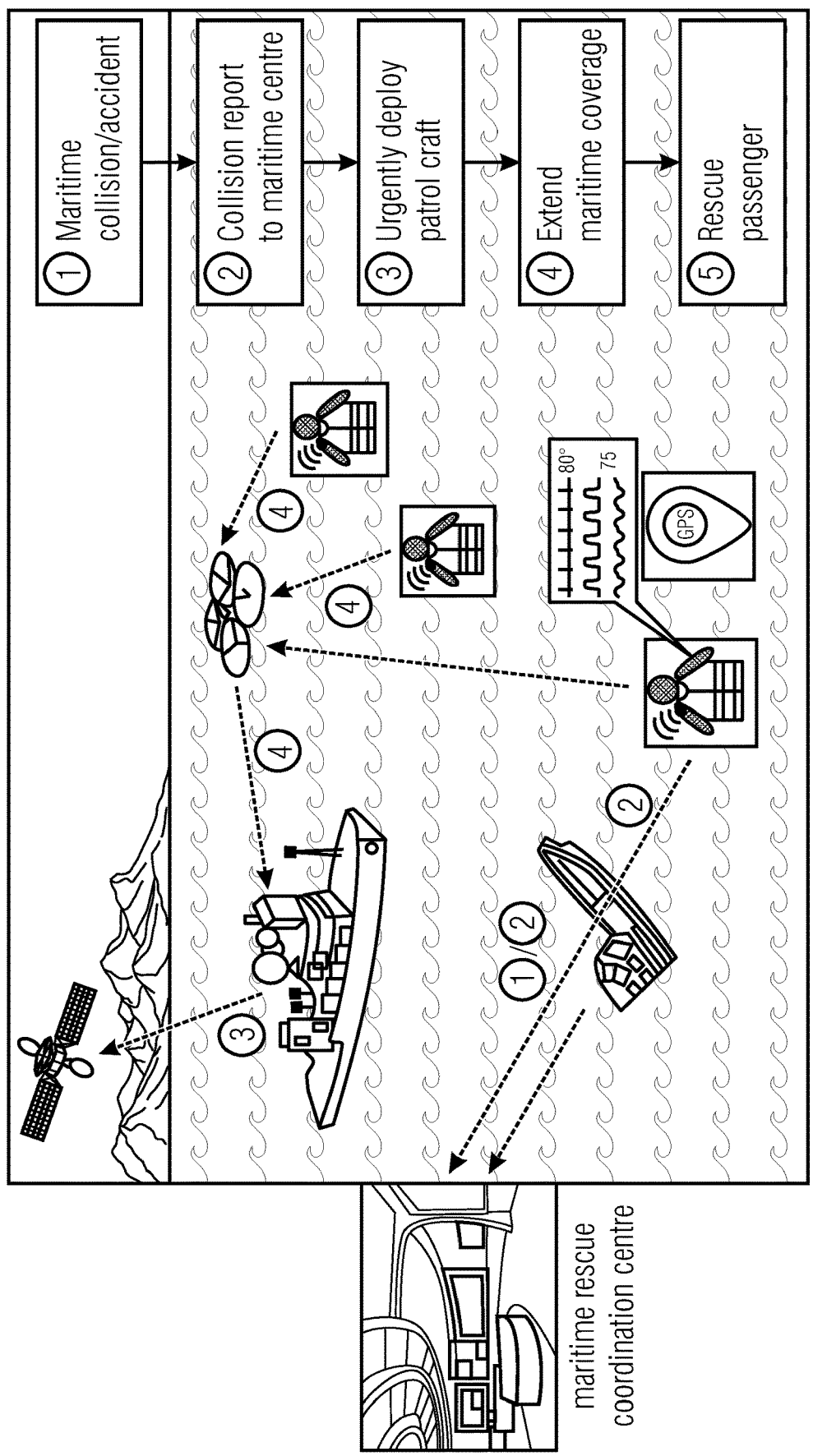
FIG. 20 shows an example of an LTE maritime Service Scenario (after [5]).

Further (wireless communication) networks that may be employed in the present invention may comprise one or more of the aforementioned networks, for instance, a combination of terrestrial networks and/or airborne networks and/or maritime networks and/or underwater networks and/or extraterrestrial networks. FIG. 20 shows an example of a (wireless) communication network comprised of terrestrial, maritime, airborne and non-terrestrial segments.

FIG. 1 shows examples of network devices 10, 11 according to embodiments of the present invention, which network devices 10, 11 may be used in at least one of the above mentioned (wireless communication) networks.

A first aspect of the invention concerns a network device 10 which is configured to transmit (indicated by arrow 15) to another network device 11 via a control channel 12 one or more control signals 13 for configuring the another network device 11 for a characterization of at least one of the network device 10 and the another network device 11 and/or for a characterization of one or more communication channels 14 between the network device 10 and the another network device 11.

A second aspect of the invention concerns the network device 11 which is configured to receive from another network device 10 via a control channel 12 one or more control signals 13 for configuring the network device 11 for a characterization of at least one of the network device 11 and the another network device 10 and/or for a characterization of one or more communication channels 14 between the network device 11 and the another network device 10.

Accordingly, two network devices 10, 11 are exemplarily described and depicted in FIG. 1, wherein the left network device 10 may be a transmitting network device (NDt) that transmits the control signals 13 via the control channel 12, while the right network device 11 may be a receiving network device (NDr) that receives the control signals 13 via the control channel 12.

According to the invention, the control channel 12 may be provided between the transmitting network device 10 and the receiving network device 11. Stated in more general terms, the control channel 12 may be provided between at least two network devices 10, 11.

The control channel 12 may be a physical channel or a logical channel via which the one or more control signals 13 may be exchanged between the two network devices 10, 11. The control channel 12 may be operated Over-the-Air (OTA), i.e. wireless, wherein the control channel 12 may be operated by means of an OTA-interface or a wireless-interface provided by each of the two network devices 10, 11. Further details as to the control channel 12 will be described later.

The depicted communication channel 14 may also be a physical or logical communication channel operated by means of a wireless interface or a wired interface provided by the network devices 10, 11.

As mentioned above, the one or more control signals 13 that may be transmitted via the control channel 12 may be used for configuring the receiving network device 11 for a characterization of the transmitting network device 10 and/or a characterization of the receiving network device 11.

Said characterization may serve to characterize the respective network device 10, 11, for example, within a certain network environment. Said characterization may, for instance, be performed by means of a test and/or a measurement, wherein said characterization may be performed and/or controlled by the transmitting network device 10 or by the receiving network device 11. For example, the receiving network device 11 may be configured via the control channel 12 to characterize, e.g. to test and/or measure a certain behaviour of itself, and optionally of one or more other network devices, within the network.

Additionally or alternatively, the one or more control signals 13 that may be transmitted via the control channel 12 may be used for configuring the receiving network device 11 for a characterization of one or more communication channels, such as the communication channel 14 between the transmitting network device 10 and the receiving network device 11. The characterization of the communication channel 14 may, for instance, be performed by a measurement of the channel quality or the like.

Various examples of said characterization may be given in the following. However, the control channel 12 itself shall be initially described in more detail with reference to FIG. 2.

Figure 2:
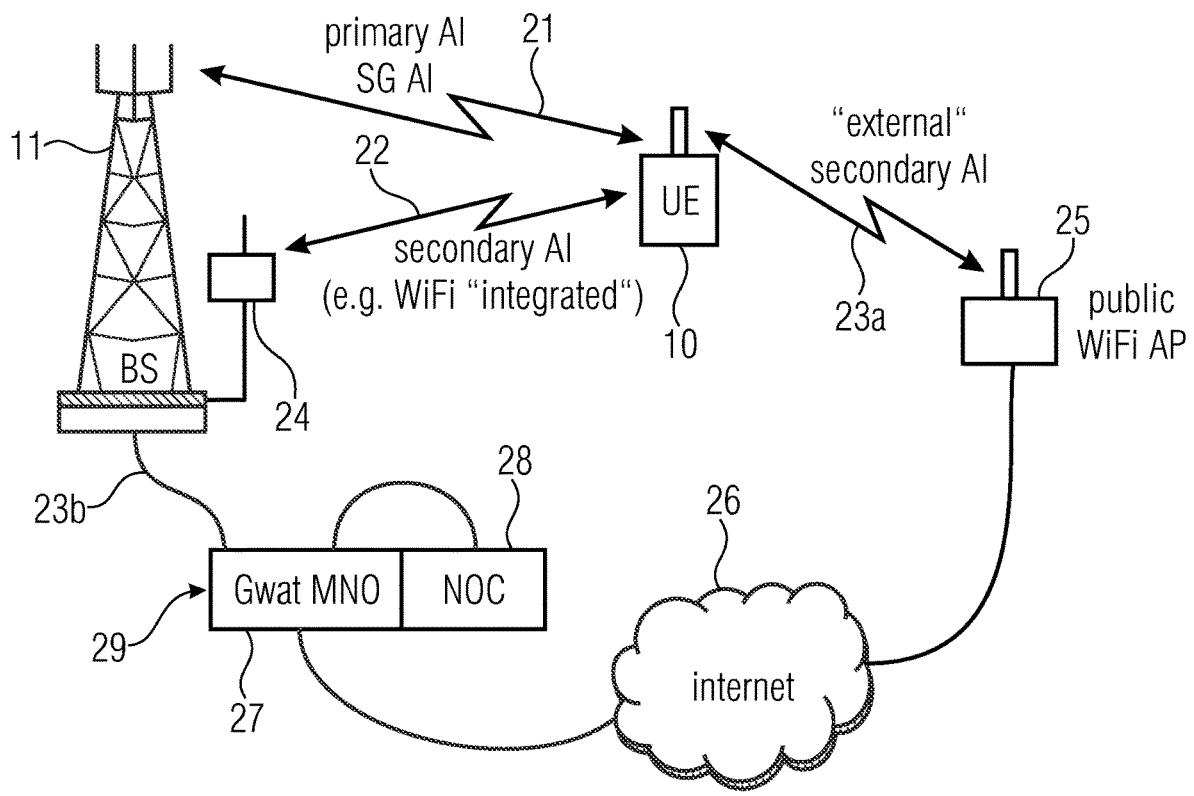
FIG. 2 shows an overview of different communication interfaces for providing a control channel according to the invention.

FIG. 2 shows a transmitting network device 10 which is exemplarily shown as a UE, and a receiving network device 11 which is exemplarily shown as a base station (BS). For example, the BS 11 may serve a radio cell in which the UE 10 is located. Inside said radio cell the UE 10 and the BS 11 may communicate with each other via a primary wireless communication interface 21. The primary wireless communication interface 21 may, for instance, be a 5G Air Interface (AI).

Additionally or alternatively, the UE 10 and the BS 11 may comprise an integrated secondary AI 22. The secondary AI 22 may, for instance, be a WiFi Interface and the BS 11 may comprise a WiFi Router or Access Point 24 or the like for providing a WiFi spot. Via the integrated secondary AI 22 the BS 11 and the UE 10 may communicate directly with one another.

Additionally or alternatively, the UE 10 may comprise an external secondary AI 23a via which the UE 10 may communicate with an external device, such as a public WiFi Router 25 for example. The external device 25 may be connected to the Internet 26. The BS 11 may comprise a third interface 23b via which it may also be connected to the Internet 26. The BS 11 may be directly connected to the Internet 26 via the third interface 23b, or as exemplarily depicted, indirectly via a network controlling instance 29, e.g. the Gateway of the Mobile Network Operator (MNO) 27 and/or the Network Operations Center (NOC) 28.

With respect to the several communication interfaces (AI) described above, there may be several possibilities to provide the aforementioned control channel 12 between the UE 10 and the BS 11.

For example, the control channel 12 may be provided and operated at the primary wireless AI 21.

According to this embodiment, the transmitting network device 10 may comprise a primary wireless communication interface 21 for communicating with one or more other network devices, which may be receiving or transmitting network devices 10, 11. Accordingly, the transmitting network device 10 of this embodiment may be configured to provide the control channel 12 at the primary wireless communication interface 21.

According to an analogous embodiment, also the receiving network device 11 may comprise a primary wireless communication interface 21 for communicating with one or more network devices 10, wherein the receiving network device 11 is configured to provide the control channel 12 at the primary wireless communication interface 21.

Additionally or alternatively, the control channel 12 may be provided and operated at the integrated secondary AI 22.

According to this embodiment, the transmitting network device 10 may comprise a secondary communication interface 22 for communicating with the another (receiving) network device 11, wherein the transmitting network device 10 may be configured to provide the control channel 12 at the secondary communication interface 21.

According to an analogous embodiment, also the receiving network device 11 may comprise a secondary communication interface 22 for communicating with the another (transmitting) network device 10, wherein the receiving network device 11 may be configured to provide the control channel 12 at the secondary communication interface 22.

Additionally or alternatively, the control channel 12 may be provided and operated at the external secondary AI 23a, 23b.

According to this embodiment, the transmitting network device 10 may comprise a secondary external communication interface 23a for communicating with an external device 25 that may be configured to communicate with the another network device 11 via a third interface 23b, and wherein the network device 10 is configured to provide the control channel 12 at the secondary external communication interface 23a, 23b.

According to an analogous embodiment, the receiving network device 11 may comprise a third interface 23b for communicating with an external device 25 that may be configured to communicate with the another (transmitting) network device 10 via secondary external interface 23a, wherein the network device 11 may be configured to provide the control channel 12 at the secondary external communication interface 23a.

As mentioned above, the control channel 12 may be used for transmitting and/or receiving control signals 13 between two network devices 10, 11. For example, the transmitting network device 10 may transmit control signals 13 to the receiving network device 11 for configuring the receiving network device 11 for a characterization as mentioned above. Concrete examples and embodiments shall now be described for disclosing further details about the characterization.

According to an embodiment, the transmitting network device 10 may be configured to control an operation and/or a configuration of the receiving network device 11 by means of the one or more control signals 13 transmitted to the receiving network device 11 via the control channel 12.

According to an analogous embodiment, the receiving network device 11 may be configured such that an operation and/or a configuration of the receiving network device 11 may be controlled by the transmitting network device 10 responsive to the one or more control signals 13 received via the control channel 12.

That is, configuration and/or operation of a network device 11 may be controlled via the control channel 12.

For example, the receiving network device 11 may be configured via the control channel 12 to operate in a predetermined mode, for example either a receive mode or a transmit mode of one of the above described communication interfaces 21, 22, 23a, 23b. Additionally or alternatively, the receiving network device 11 may be configured via the control channel 12 to perform a predetermined action, e.g. to send a signal, a beam or a first spatial electromagnetic radiation characteristic, or even to actively re-adjust any hardware and/or software modules. Further additionally or alternatively, the receiving network device 11 may be configured via the control channel 12 to perform a predetermined test procedure and/or to perform a predetermined measurement procedure.

According to such an embodiment, the receiving network device 11 may be configured to, responsive to the one or more control signals 13 received via the control channel 12, operate in a predetermined mode and/or to perform a predetermined action and/or to perform a predetermined test procedure for the characterization of the at least one of the receiving network device 11 and the transmitting network device 10 and/or of the one or more communication channels 21, 22, 23a, 23b between the receiving network device 11 and the transmitting network device 11.

According to an analogous embodiment, the transmitting network device 10 may be configured to instruct the receiving network device 11, by means of the one or more control signals 13 transmitted via the control channel 12, to operate in a predetermined mode and/or to perform a predetermined action and/or to perform a predetermined test procedure and/or to perform a predetermined measurement procedure for the characterization of at least one of the transmitting network device 10 and the receiving network device 11 and/or of the one or more communication channels 21, 22, 23a, 23b between the transmitting network device 10 and the receiving network device 10.

Of course it may also be possible that the transmitting network device 10 may communicate with two or more receiving network devices 11a, 11b. Such an embodiment is shown in FIG. 3.

Figure 3:
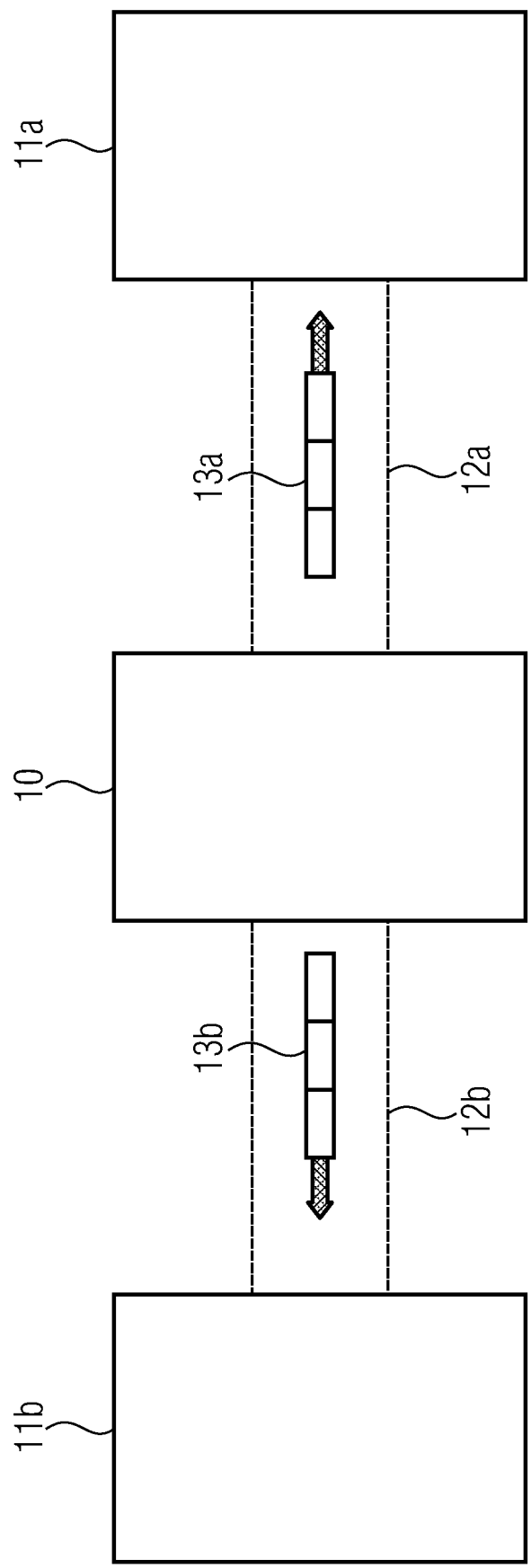
FIG. 3 shows a further embodiment of network devices according to the invention.

FIG. 3 shows one transmitting network device 10 which may communicate with two receiving network devices 11a, 11b. However, the transmitting network device 10 of this embodiment is configured to communicate with two or even more, i.e. with a plurality of receiving network devices 11a, 11b.

An individual control channel 12a, 12b may be provided between each of the plurality of receiving network devices 11a, 11b and the transmitting network device 10. The transmitting network device 10 may be configured to transmit the one or more control signals 13a, 13b via the control channel 12a, 12b to the respective receiving network device 11a, 11b.

According to this embodiment, the transmitting network device 10 is configured to transmit the one or more control signals 13a, 13b to a plurality of receiving network devices 11a, 11b via an individual control channel 12a, 12b between the transmitting network device 10 and each of the plurality of receiving network devices 11a, 11b.

The transmitting network device 10 may orchestrate operation of the plurality of receiving network devices 11a, 11b. For example, each of the plurality of receiving network devices 11a, 11b may be triggered at the same time or time interval to operate responsive to the control signals 13a, 13b. Such an operation may, for instance, be used for the aforementioned characterization of a network device 10, 11 and/or a communication channel 21, 22, 23a, 23b.

Even though the receiving network devices 11a, 11b may be triggered at the same time, the receiving network devices 11a, 11b may operate in same or different ways at same or different times. The control of how and when a receiving network device 11a, 11b operates may be controlled by the transmitting network device 10, namely by transmitting the control signals 13a, 13b via the control channels 12a, 12b. This control function of controlling a plurality of receiving network devices 11a, 11b may also be referred to as an orchestration of said plurality of receiving network devices 11a, 11b.

According to this embodiment, the transmitting network device 10 may be configured to orchestrate operation of the plurality of the receiving network devices 11a, 11b by transmitting a plurality of same or different control signals 13a, 13b via the individual control channels 12a, 12b to the plurality of the receiving network devices 11a, 11b at a same time or time interval.

Alternatively, instead of transmitting the control signals at a same time or time interval, the transmitting network device 10 may be configured to orchestrate operation of the plurality of the receiving network devices 11a, 11b by transmitting a plurality of same or different control signals 13a, 13b via the individual control channels 12a, 12b to the plurality of the receiving network devices 11a, 11b at a different time or different time intervals.

For example, the receiving network devices 11a, 11b may be triggered by the control signals 13a, 13b to perform a certain action at the same time or time interval, wherein each of the receiving network devices 13a, 13b may perform a different action at the same time. For example, a first receiving network device 11a may measure the channel quality of the primary wireless communication interface 21, while at the same time a second receiving network device 11b may perform a cooperative network test in cooperation with the transmitting network device 10.

According to this embodiment, the transmitting network device 10 may be configured to instruct each of the plurality of the receiving network devices 11a, 11b by means of the one or more control signals 13a, 13b transmitted via the control channel 12a, 12b to operate in a predetermined mode and/or to perform a predetermined action and/or to perform a predetermined test procedure and/or to perform a predetermined measurement procedure at the same time or time interval for the characterization of at least one of the transmitting network device 10 and the receiving network devices 11a, 11b and/or of the one or more communication channels 21, 22, 23a, 23b between the transmitting network device 10 and the receiving network devices 11a, 11b.

According to an analogous embodiment, the first receiving network device 11a may be configured to, responsive to the one or more control signals 13a transmitted via the control channel 12a, operate in a predetermined mode and/or to perform a predetermined action and/or to perform a predetermined test procedure and/or to perform a predetermined measurement procedure at the same time or time interval than at least the second receiving network device 11b.

Alternatively, the transmitting network device 10 may orchestrate each receiving network device 11a, 11b via the control channel 12a, 12b to operate in a certain way, e.g. to perform the characterization of the network devices 10, 11 and/or the communication channels 21, 22, 23a, 23b, sequentially one after another.

According to this embodiment, the transmitting network device 10 may be configured to instruct each of the plurality of the receiving network devices 11a, 11b by means of the one or more control signals 13a, 13b transmitted via the control channel 12a, 12b to operate in a predetermined mode and/or to perform a predetermined action and/or to perform a predetermined test procedure and/or to perform a predetermined measurement procedure sequentially one after another for the characterization of at least one of the transmitting network device 10 and the receiving network devices 11a, 11b and/or of the one or more communication channels 21, 22, 23a, 23b between the transmitting network device 10 and the receiving network devices 11a, 11b.

As a further example, the transmitting network device 10 may orchestrate each of the plurality of receiving network devices 11a, 11b to perform the same action for characterizing the network devices 10, 11 and/or the communication channels. The transmitting network device 10 may orchestrate the receiving network devices 11a, 11b such that they may perform said same action either at the same time or sequentially one after another.

According to this embodiment, the transmitting network device 10 may be configured to instruct each of the plurality of the receiving network devices 11a, 11b by means of the one or more control signals 13a, 13b transmitted via the control channel 12a, 12b to operate in the same predetermined mode and/or to perform the same predetermined action and/or to perform the same predetermined test procedure and/or to perform the same predetermined measurement procedure for the characterization of at least one of the transmitting network device 10 and the receiving network device 11a, 11b and/or of the one or more communication channels 21, 22, 23a, 23b between the transmitting network device 10 and the receiving network devices 11a, 11b.

According to an analogous embodiment, the receiving network device 11a may be configured to, responsive to the one or more control signals 13a transmitted via the control channel 12a, operate in the same predetermined mode and/or to perform the same predetermined action and/or to perform the same predetermined test procedure and/or to perform the same predetermined measurement procedure as at least a second receiving network device 11b.

Figure 4:
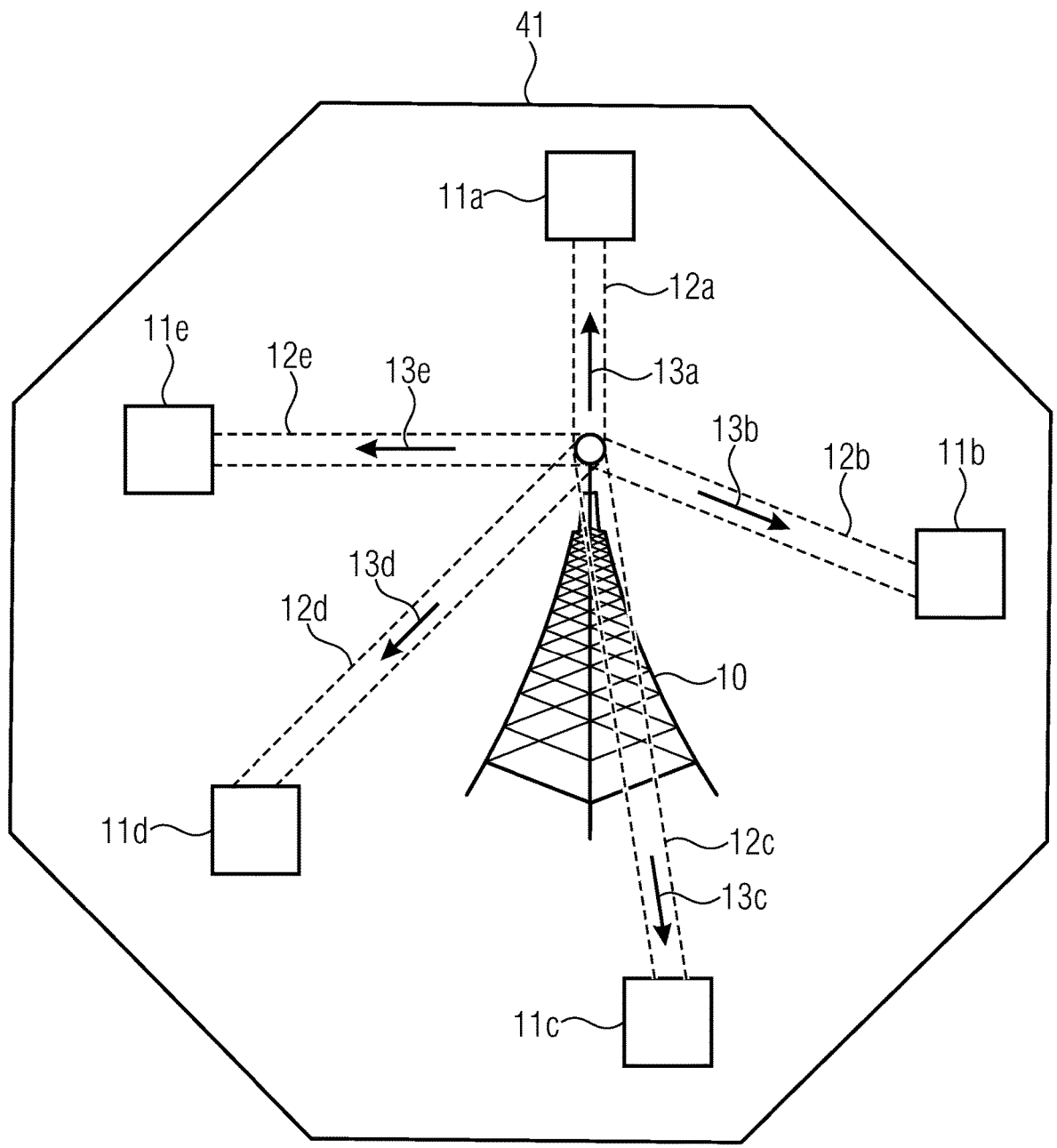
FIG. 4 shows a further embodiment of network devices according to the invention.

An example for the above mentioned orchestration is shown in FIG. 4. A base station (BS) 10 represents the transmitting network device in this example. The BS 10 serves a radio cell 41 in which a plurality of receiving network devices 11a-11e are located. In this example, the receiving network devices 11a-11e may be IoT devices.

A control channel 12a-12e may be provided between each of the plurality of receiving network devices 11a-11e. The BS 10 may transmit control signals 13a-13e to each of the plurality of receiving network devices 11a-11e via the respective control channel 12a-12e.

Upon receipt of the control signals 13a-13e the receiving network devices 12a-12e may be configured to perform the above mentioned characterization of itself or the BS 10 and/or any communication channel 21, 22, 23a, 23b, e.g. by performing a certain action. For example, if the IoT devices 11a-11e were thermostats of radiators in a smart home or the like, the BS 10 may want to test whether these thermostats 11a-11e are working correctly. Thus, the BS 10 may transmit control signals 13a-13e via the control channels 12a-12e to the IoT devices 11a-11e to configure them to perform the respective test. The BS 10 may control operation of the IoT devices 11a-11e, i.e. the BS 10 may orchestrate the IoT devices 11a-11e for performing the test.

According to the invention, such a test may be performed in situ, e.g. in deployed networks, as shown in FIG. 4. However, according to the inventive principle, such tests may also be performed in any test environment, for instance in anechoic chambers, in non-anechoic chambers, in measurement chambers, in Virtual Electromagnetic Environments (VEE) or any other test environments, as will be described in more detail at the end of the description.

In the latter case any component or device, such as a controller, of the respective test environment may then represent the transmitting network device 10, instead of the BS 10 depicted in FIG. 4. Additionally or alternatively, said controller of the test environment may also be configured as a receiving network device 11, instead of the IoT devices 11a-11e depicted in FIG. 4. The decision whether a controller of a test environment may be configured as a transmitting network device 10 or a receiving network device 11 may depend on the test to be performed. Details as to test environments will be given at the end of the description.

Independent from whether the network devices 10, 11 are tested in situ in deployed networks or in certain test environments prior to being deployed, one of several advantages of the present invention is that at least one of the network devices 10, 11 may control operation and/or configuration of itself or even of another network device via the inventive control channel 12. By this concept, an inventive End-to-End Over-the-Air Test and Measurement System can be provided comprising at least two such inventive network devices 10, 11 and the inventive control channel 12 therebetween.

Since these tests are cooperatively performed by the transmitting network device 10 and the receiving network device 11, these tests may also be referred to as cooperative tests.

Figure 5:
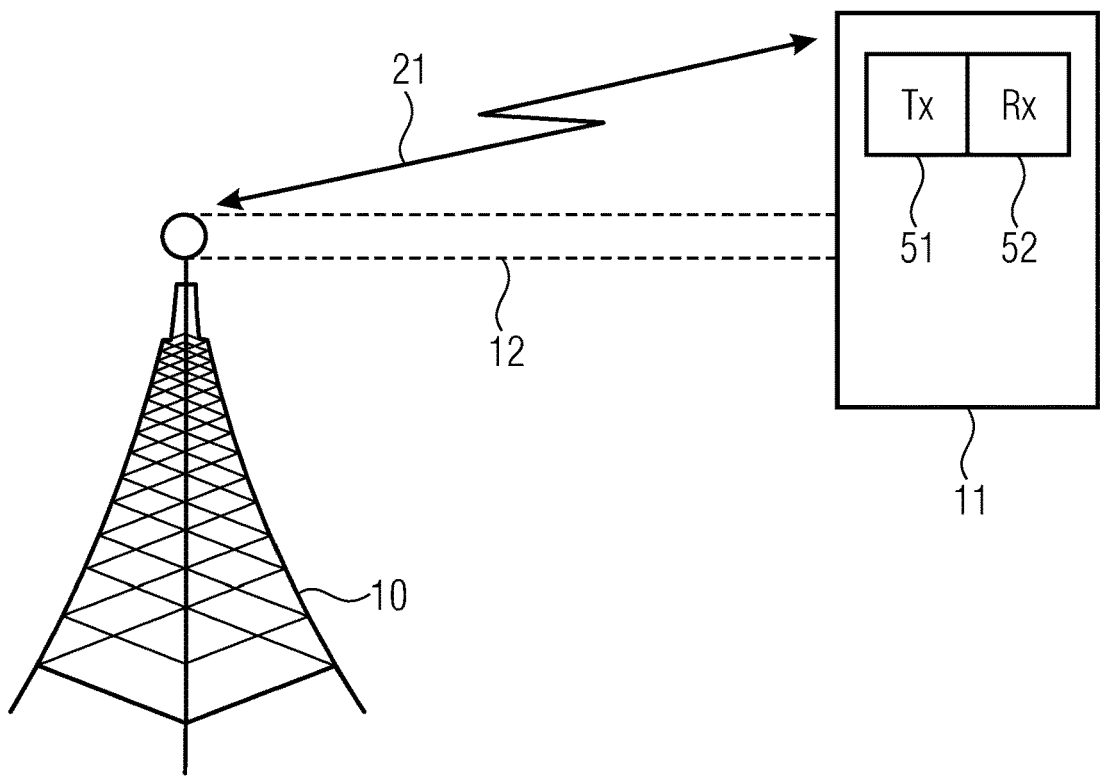
FIG. 5 shows a further embodiment of network devices according to the invention.

A further example for a cooperative test is shown in FIG. 5. Here, the receiving network device 11 may be a UE (e.g. smartphone, etc.) configured for communicating with the BS 10 via their primary wireless communication interface 21, e.g. a 5G Air Interface.

The UE 11 may comprise a receive mode 52 for receiving signals via its primary wireless communication interface 21 and a transmission mode 51 for transmitting signals via its primary wireless communication interface 21.

As can also be seen in FIG. 5, a control channel 12 may be provided between the BS 10 and the UE 11. The control channel 12 may, for instance, be provided on a different channel separate from the primary wireless communication interface 21.

This may have the advantage that channel capacity of the primary wireless communication interface 21 may be fully available for testing. For example, if realized by wireless, the primary communication interface 21 shall be tested, while the control channel 12 may be provided on a secondary or auxiliary interface 22, 23a, 23b logically and physically using independent radio resources. In this way, interference between the control channel 12 and the actual performance measurement OTA can be avoided and the amount of protocol overhead e.g. detailed measurement reports does scale independently from the capabilities of the primary wireless communication interface 21 under test.

Still with reference to FIG. 5, the BS 10 may control operation of the UE 11 via the control channel 12. Depending on the test to be performed, the BS 10 may control the UE 11 to operate in the transmission mode 51 or to operate in the receive mode 52. Depending on the chosen operation mode 51, 52 the UE 11 may be appropriately configured to perform a test of the primary wireless communication interface 21 either in transmission or reception mode for characterizing the primary wireless communication interface 21 (i.e. communication channel) between itself 11 and the BS 10. For example, the UE 11 may be configured to characterize the primary wireless communication interface 21 by testing channel quality or the like.

According to the embodiment shown in FIG. 5, the transmitting network device 10 may instruct the receiving network device 11 to set its primary wireless communication interface 21 (e.g. 5G AI) into a transmit mode 51 and/or into a receive mode 52. Accordingly, the transmitting network device 10 may comprise a primary wireless communication interface 21 (e.g. 5G AI) for communicating with one or more network devices 11, wherein the transmitting network device 10 may be configured to instruct the receiving network device 11 by means of the one or more control signals 13 transmitted via the control channel 12 to operate in a receive mode 52 for receiving a signal via the primary wireless communication interface 21 (e.g. 5G AI), or to operate in a transmission mode 51 for transmitting a signal via the primary wireless communication interface 21.

According to an analogous embodiment, the receiving network device 11 may comprise a primary wireless communication interface 21 (e.g. 5G AI) for communicating with one or more network devices 10, wherein the receiving network device 11 may be configured to, responsive to the one or more control signals 13 transmitted via the control channel 12, operate in a receive mode 52 for receiving a signal via its primary wireless communication interface 21 (e.g. 5G AI) or to operate in a transmission mode 51 for transmitting a signal via its primary wireless communication interface 21.

As mentioned above, the UE 11 may be configured via the control channel 12 to perform a certain test. An advantage of the invention is that the transmitting network device 10 and the receiving network device 11 may be set up via the control channel 12 to perform a cooperative test in which both network devices 10, 11 perform a test in cooperation with each other. A further example of such a cooperative test shall be described with reference to FIG. 6.

Figure 6:
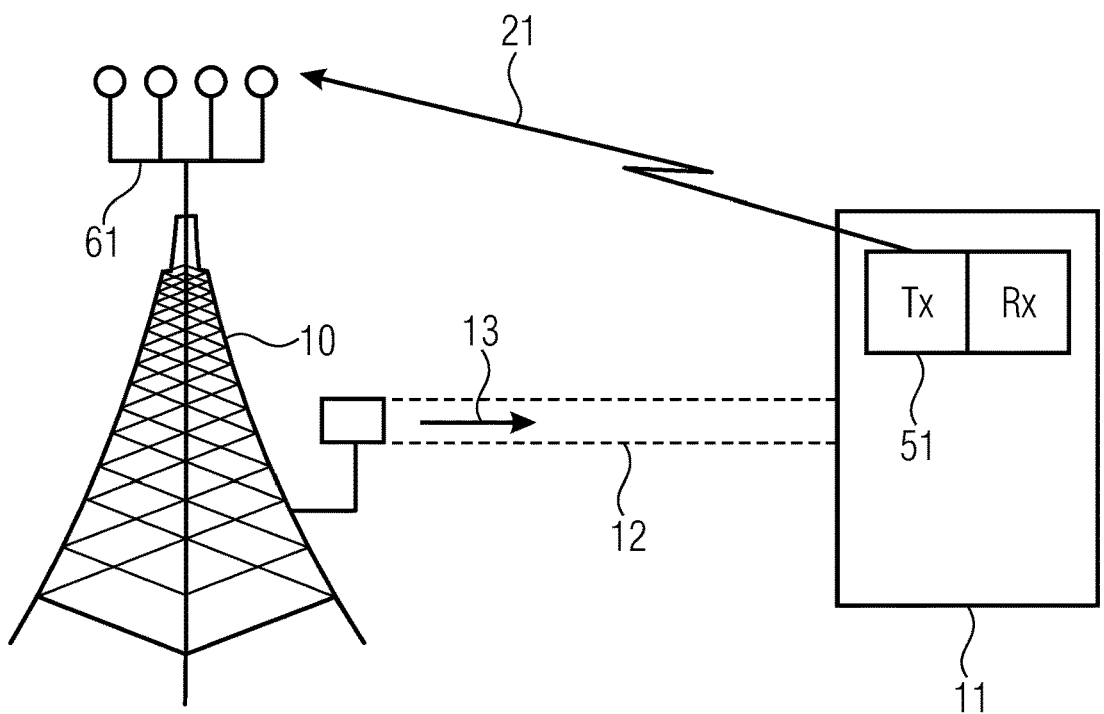
FIG. 6 shows a further embodiment of network devices according to the invention.

FIG. 6 shows a BS 10 having a plurality of antennas 61, e.g. an antenna array, for communicating via the primary wireless communication interface 21 (e.g. 5G AI). A control channel 12 may be provided between the BS 10 and an UE 11.

The BS 10 may be configured to transmit one or more control signals to the UE 11 instructing the UE 11 to operate in a transmission mode 51 with respect to the primary wireless communication interface 21.

That is, the BS 10 may be a transmitting network device since it transmits the control signals 13 to the UE 11 which is the receiving network device with respect to the control channel 12. However, with respect to the primary wireless communication interface 21 the UE 11 is the transmitter while the BS 10 is the receiver of the signals exchanged via the primary wireless communication interface 21. That is, the terms transmitting network device 10 and receiving network device 11 may refer to the control signals 13 being transmitted or received via the control channel 12.

Accordingly, the BS 10 may transmit the control signals 13 via the control channel 12 to the UE 11 instructing the UE 11 to transmit signals via the primary wireless communication interface 21. The BS 10 may receive said signals via the primary wireless communication interface 21 and may perform a measurement of said received signals, for example for characterizing the channel quality or the like of the primary wireless communication interface 21 by evaluating one or more reception parameters, such as signal strength, Angle of Arrival (AoA), Time of Arrival (ToA) and the like.

Thus, according to this embodiment, the transmitting network device 10 may be configured to transmit the one or more control signals to the receiving network device 11 via the control channel 12 for instructing the receiving network device 11 to operate in the transmission mode 51 and to transmit a signal via the primary wireless communication interface 21, wherein the transmitting network device 10 is further configured to receive, via the primary wireless communication interface 21, the signal from the receiving network device 11, and to perform a measurement of the received signal for evaluating one or more reception parameters of the received signal.

The BS 10 may use the result of the above mentioned cooperative channel test for performing a predetermined action. For example, if some or all of the plurality of antennas 61 may be misaligned due to a storm or the like, the BS 10 may derive the degree of misalignment from the evaluated result of the cooperative channel test, for instance, if the channel test reveals that the channel quality is outside a predetermined desired range. Accordingly, the BS 10 may be configured to re-adjust the one or more misaligned antennas 61 such that channel quality is within the predetermined desired range again. Further additionally or alternatively, the BS 10 may, under similar conditions, send a message or otherwise alert the Network Operations Centre (NOC) 28 (see FIG. 2) of such a misalignment.

Thus, according to this embodiment, the transmitting network device 10 may be configured to perform a predetermined action (e.g. re-adjustment of antennas) if the one or more evaluated reception parameters are outside a predetermined target range (e.g. degree of misalignment).

Figure 7:
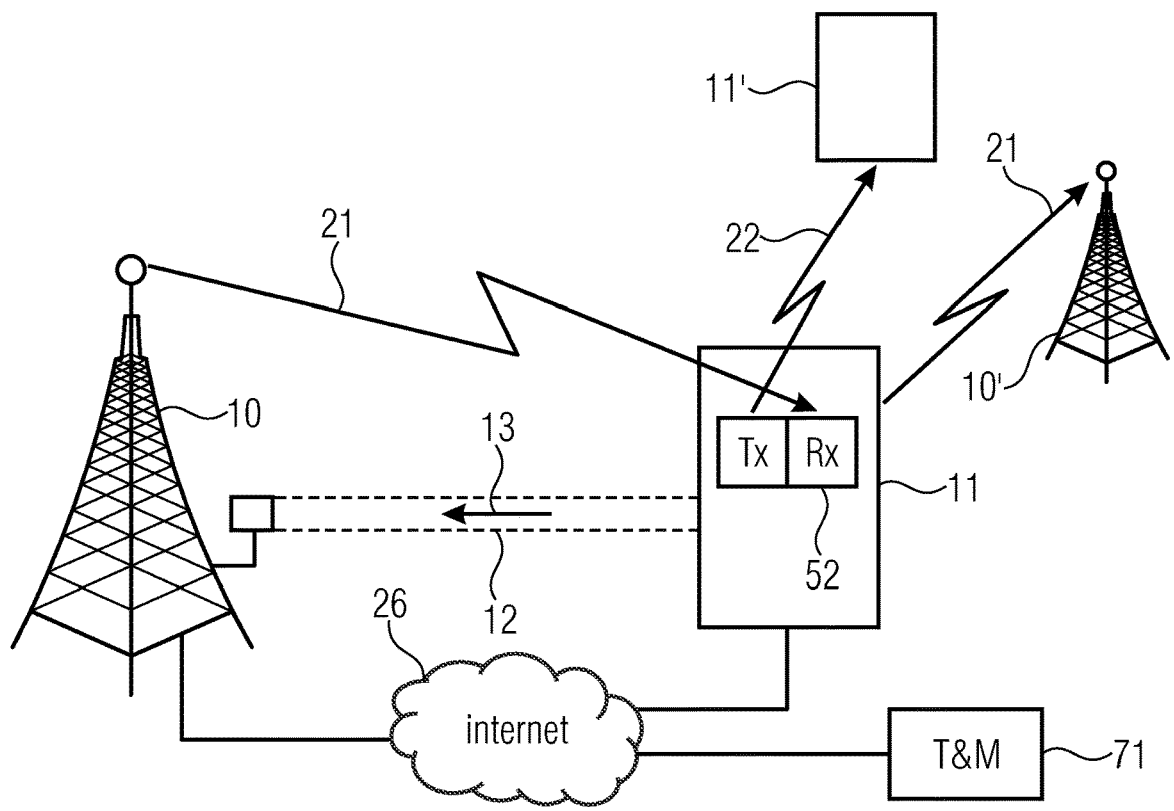
FIG. 7 shows a further embodiment of network devices according to the invention.

A cooperative test may also be performed in the other direction, as exemplarily depicted in FIG. 7. For example, the BS 10 may instruct the UE 11 via the control channel 12 to operate in a receive mode 52 for receiving one or more signals via the primary wireless communication interface 21 (e.g. 5G AI).

This test may then be performed cooperatively in that the UE 11 (receiving network device) may also be configured via the control channel 12 to perform a measurement of the received signal (received via the primary wireless communication interface 21) for evaluating one or more reception parameters of the received signal and to report the result of the measurement to the BS 10 (transmitting network device).

Additionally or alternatively, the UE 11 may report the result of the measurements to another UE 11' (receiving network device) or even to another BS 10' (transmitting network device). Further additionally or alternatively, the UE 11 may report the result of the measurements to an external Test and Measurement System 71 which may itself be a node of the network under test or of another network.

For transmitting, i.e. reporting, the result of the measurements to the respective devices 10, 10', 11', 71 the UE 11 may make use of any one or more of its above discussed (FIG. 2) interfaces 21, 22, 23a, 23b. Additionally or alternatively, the result of the measurement may also be transmitted via the control channel 12.

For example, the UE 11 may transmit the result of the measurements to the BS 10 via the Internet 26. Additionally or alternatively, the UE 11 may transmit the result of the measurements to the other BS 10' via its primary wireless communication interface 21. Additionally or alternatively, the UE 11 may transmit the result of the measurements to the other UE 11' via its integrated secondary wireless communication interface 22, e.g. via WiFi. Additionally or alternatively, the UE 11 may transmit the result of the measurements to the external T&M System 71 via the Internet 26.

Additionally or alternatively, the UE 11 may also transmit the result of the measurements via the control channel 12, for example if the recipient of the result does not possess one of the aforementioned suitable interfaces 21, 22, 23a, 23b.

Thus, according to this embodiment, the transmitting network device 10 may be configured to transmit the one or more control signals 13 to the receiving network device 11 via the control channel 12 for instructing the receiving network device 11 to operate in a receive mode 52 to receive a signal via the primary wireless communication interface 21 from the transmitting network device 10, and for instructing the receiving network device 10 to perform a measurement of the received signal for evaluating one or more reception parameters of the received signal and to report the result of the measurement to the transmitting network device 10 and/or to yet another transmitting or receiving network device 10', 11' and/or to an external Test and Measurement System 71.

According to an analogous embodiment, the receiving network device 11 may be configured to, responsive to the one or more control signals 13 transmitted via the control channel 12, operate in the receive mode 52 and to receive a signal via the primary wireless communication interface 21 from the transmitting network device 11, to perform a measurement of the received signal for evaluating one or more reception parameters of the received signal and to report the result of the measurement to the transmitting network device 10 and/or to yet another transmitting or receiving network device 10', 11' and/or to an external Test and Measurement System 71.

Figure 8:
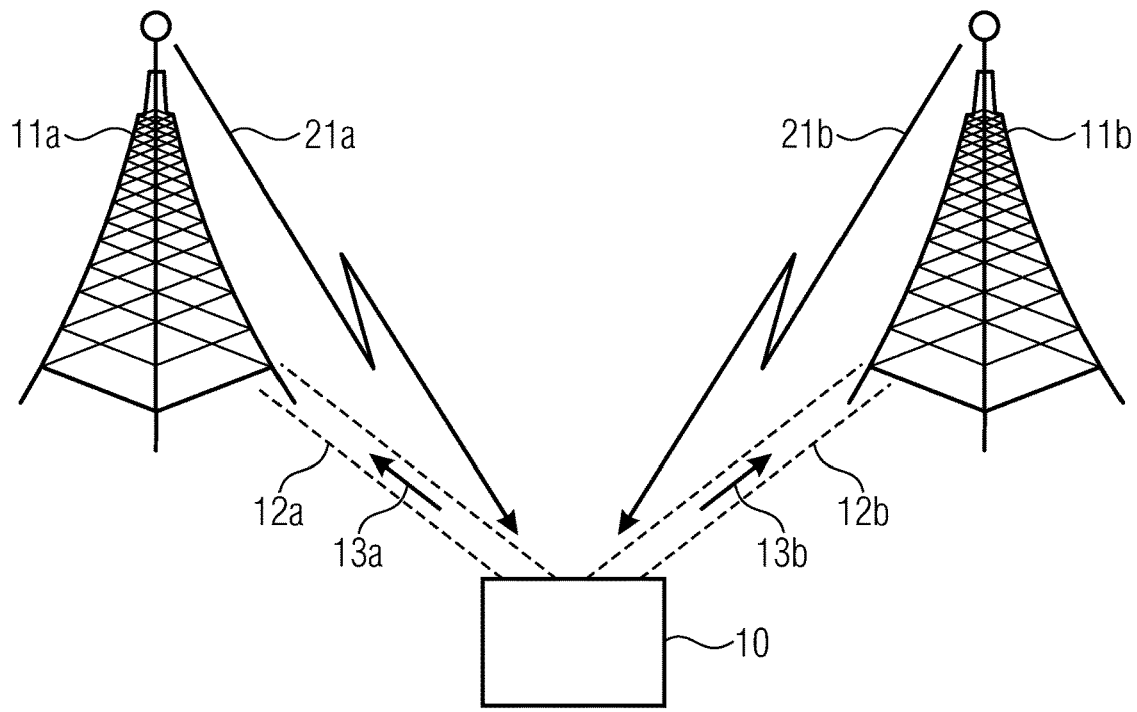
FIG. 8 shows a further embodiment of network devices according to the invention.

FIG. 8 shows a further example of a cooperative test according to the present invention. In this example, a download test may be performed cooperatively between a transmitting device 10, for example an UE, and at least one receiving network device 11, for example a base station. In this example, the UE 10 is configured to perform a cooperative test between a first base station 11a and a second base station 11b.

The UE 10 may transmit one or more control signals 13a to the first base station 11a via a control channel 12a. Furthermore, the UE 10 may transmit one or more control signals 13b to the second base station 11b via a control channel 12b. The UE 10 may transmit the control signals 13a, 13b via individual control channels 12a, 12b as depicted, or via one and the same control channel.

The UE 10 may trigger the base stations 11a, 11b via said control channels 12a, 12b to perform a cooperative download test, wherein predetermined data may be downloaded by the UE 10 from each of the base stations 11a, 11b via the primary wireless communication interfaces 21a, 21b (e.g. 5G AI). The download test is for performing a characterization of the primary wireless communication interfaces 21a, 21b (i.e. communication channels) between the UE 10 and the base stations 11a, 11b, for example for evaluating network capacities.

For example, the UE 10 may trigger the base stations 11a, 11b via the control channels 12a, 12b to provide predetermined data, for instance data of a predetermined size, e.g. one Gigabyte of data, or data of a predetermined type, for downloading by the UE 10 via the primary wireless communication channel 21a, 21b.

Even though this example with reference to FIG. 8 may have been exemplarily described with respect to a download test via the primary wireless communication channel 21a, 21b said download test may also be performed via one or more of the communication channels 21, 22, 23a, 23b described with reference to FIG. 2 for performing a characterization of said communication channel 21, 22, 23a, 23b.

According to this embodiment, the transmitting network device (e.g. UE) 10 may comprise a primary wireless communication interface 21a, 21b (e.g. 5G AI) for communicating with one or more receiving network devices 12a, 12b (e.g. base stations), wherein the transmitting network device 10 may be configured to transmit the one or more control signals 13a, 13b to at least two of the another network devices 11a, 11b via the control channel 12a, 12b for performing a download test, wherein the transmitting network device 10 may be configured to download predetermined data from each of the at least two another network devices 11a, 11b via its primary communication interface 21a, 21b (e.g. 5G AI).

According to an analogous embodiment, at least one of the receiving network devices 11a, 11b may comprise a primary wireless communication interface 21a, 21b (e.g. 5G AI) for communicating with one or more network devices, e.g. the transmitting network device 10, wherein the at least one receiving network device 11a, 11b may be configured to, responsive to the one or more control signals 13a, 13b transmitted via the control channel 12a, 12b, perform a download test, wherein the at least one receiving network device 11a, 11b may be configured to provide predetermined data (e.g. a block of 1 GB) for downloading by the transmitting network device 10 via its primary communication interface 21a, 21b (e.g. 5G AI).

The above described example may also be performed in the other direction, i.e. a cooperative upload test may also be performed. In this case the UE 10 in FIG. 8 may trigger, via the control channel 12a, 12b, at least one of the base stations 11a, 11b to perform an upload test, wherein predetermined data may be uploaded by the UE 10 via its primary wireless communication channel 21a, 21b to at least one of the base stations 11a, 11b. The upload test may also be performed at one or more of the communication channels 21, 22, 23a, 23b described with reference to FIG. 2.

According to this embodiment, the transmitting network device 10 (e.g. UE) may comprise a primary wireless communication interface 21a, 21b (e.g. 5G AI) for communicating with one or more receiving network devices 11a, 11b (e.g. base stations), wherein the transmitting network device 10 may be configured to transmit the one or more control signals 13a, 13b to at least two of the receiving network devices 11a, 11b via the control channel 12a, 12b for performing an upload test, wherein the transmitting network device 10 may be configured to upload predetermined data to each of the at least two receiving network devices 11a, 11b via its primary communication interface 21a, 21b (e.g. 5G AI).

According to an analogous embodiment, at least one of the receiving network devices 11a, 11b (e.g. base stations) may comprise a primary wireless communication interface 21a, 21b (e.g. 5G AI) for communicating with one or more network devices 10, 11a, 11b, wherein the at least one of the receiving network devices 11a, 11b may be configured to, responsive to the one or more control signals 13a, 13b transmitted via the control channel 12a, 12b, perform an upload test, wherein the at least one of the receiving network devices 11a, 11b may be configured to receive predetermined data uploaded by the transmitting network device 10 via its primary communication interface 21a, 21b (e.g. 5G AI).

The UE 10 and/or at least one of the base stations 11a, 11b may evaluate the result of the download test and/or the upload test. For example, the respective network device may evaluate the result in terms of how much of the exchanged predetermined data has been received without loss along the propagation path, how many errors may have occurred during transmission, how fast was the predetermined data exchanged, or the like.

According to an example, the UE 10 may use the result of the above mentioned download test and/or of the upload test for selecting a suitable service provider. For example, the UE 10 may compare the result of the download test and/or the upload test which had been previously cooperatively performed with each of the two base stations 11a, 11b. By means of this evaluation the UE 10 may evaluate which one of the two base stations 11a, 11b may provide the better channel quality of the primary wireless communication channel 21a, 21b. Accordingly, the UE 10 may connect to this particular one of the two (or even more) base stations 11a, 11b.

According to this embodiment, the transmitting network device 10 may be configured to compare the result of the download test and/or upload test of the at least two receiving network devices 11a, 11b with each other and to select, based on the result of the download test and/or upload test, one of the at least two receiving network devices 11a, 11b for connecting thereto via its primary wireless communication interface 21a, 21b (e.g. 5G AI).

Figure 9:
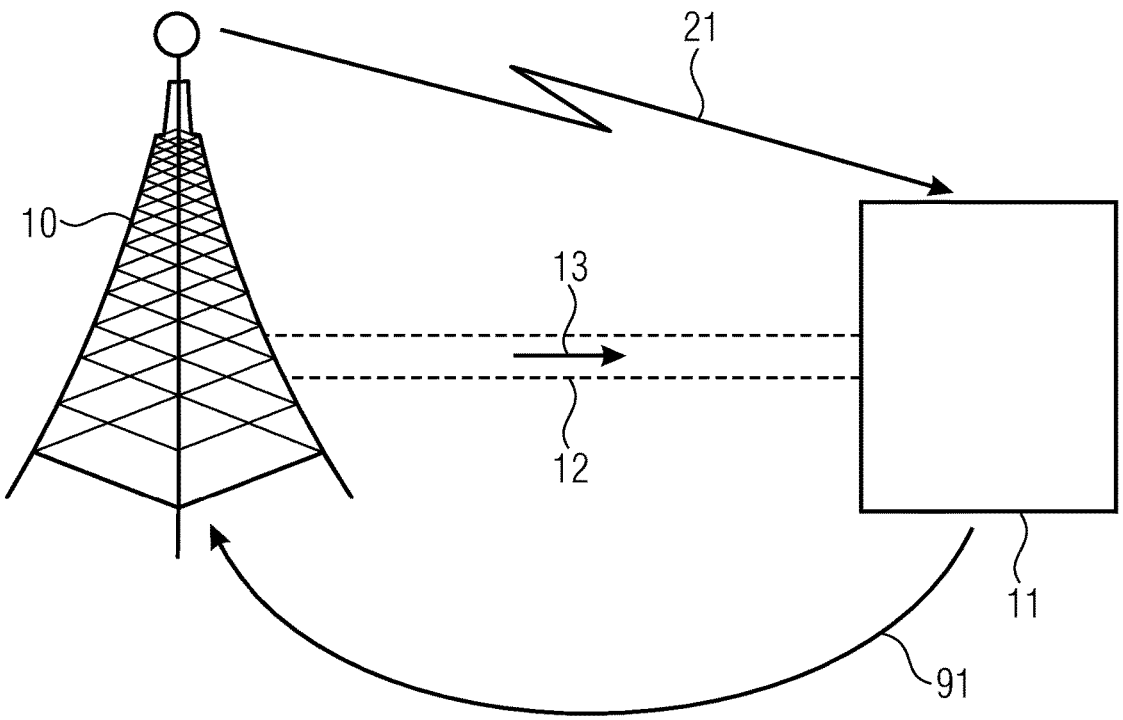
FIG. 9 shows a further embodiment of network devices according to the invention.

FIG. 9 shows a further example of a cooperative test between a transmitting and a receiving network device 10, 11. In this example, the transmitting network device 10 may be a base station, while the receiving network device 11 may be a UE.

In this example, the network may perform a network self test, for instance, by evaluating the channel quality of the primary wireless communication channel 21. For this purpose, the base station 10 may transmit one or more control signals 13 via the control channel 12 to the UE 11. Responsive to the received control signals 13 the UE 11 may be triggered to receive predetermined data from the base station 10 via its primary wireless communication interface 21.

Further responsive to the control signals 13 the UE 11 may be triggered to perform a channel quality test for evaluating the quality of the primary wireless communication channel 21 as exemplarily described above. For example, the UE 11 may evaluate an amount and/or a quality of the predetermined data received via the primary wireless communication channel 21.

The UE 11 may further be triggered, responsive to the control signals 13, to report the result of the channel quality test to the base station 10, which is indicated by means of the arrow 91 in FIG. 9. The UE 11 may use one or more of the communication channels 21, 22, 23a, 23b described with reference to FIG. 2 for reporting the result to the base station 10. Additionally or alternatively, the UE 11 may also use the control channel 12 for reporting the result to the base station 10.

Thus, according to this embodiment the transmitting network device 10 may comprise a primary wireless communication interface 21 (e.g. 5G AI) for communicating with one or more network devices 10, 11, wherein the transmitting network device 10 may be configured to transmit the one or more control signals 13 to the receiving network device 11 via the control channel 12 for instructing the receiving network device 11 to perform a channel quality test by receiving, via its primary wireless communication interface 21, predetermined data transmitted from the transmitting network device 10 via its primary wireless communication interface 21, and to report to the transmitting network device 10 an amount and/or a quality of the received predetermined data for evaluating a channel quality of the primary communication interface 21 between the transmitting network device 10 and the receiving network device 11.

According to an analogous embodiment, the receiving network device 11 may comprise a primary wireless communication interface 21 (e.g. 5G AI) for communicating with one or more network devices 10, 11, wherein the receiving network device 11 may be configured to, responsive to the one or more control signals 13 transmitted via the control channel 12, perform a channel quality test by receiving via its primary communication interface 21 predetermined data transmitted from the transmitting network device 10 and to report to the transmitting network device 10 an amount and/or a quality of the received predetermined data for evaluating a channel quality of the primary communication interface 21 between the receiving network device 11 and the transmitting network device 10.

The above examples as described with reference to the Figures may have been exemplarily described within a deployed network scenario. However, as mentioned in the introductory portion the network devices, i.e. transmitting network device 10 and/or receiving network device 11, may also be operated in a test environment.

In such a test environment, any wireless communication network may be tested. In this case, the wireless communication network may also be referred to as a network under test. Since the network under test may be a network prior to being deployed in situ, said wireless communication network under test may also be referred to as a pre-deployment network.

The network devices, i.e. the transmitting network device 10 and/or the receiving network device 11, may also be subjected to testing. Accordingly, a network device 10, 11 being tested may also be referred to as a Device Under Test (DUT).

For testing such network devices 10, 11 (DUT) in a pre-deployment network scenario, so-called Test and Measurement Systems may be used. If the pre-deployment network is a wireless communication network, the Test and Measurement System may be referred to as an Over-the-Air Test and Measurement System. Such an Over-the-Air Test and Measurement System may comprise dedicated Over-the-Air Test and Measurement Equipment. The dedicated Over-the-Air Test and Measurement Equipment may comprise one or more components.

Accordingly, an Over-the-Air Test and Measurement System may comprise all hardware equipment, modules and components that may be used in order to perform the useful set or sets of measurements (including the appropriate procedures) on the DUTs 10, 11 or the network itself. This may therefore include, e.g., electrical, mechanical, electro-mechanical, electromagnetic and electronic devices, examples of which may include antennas, positioners, turntables, shielded rooms, radiation absorbing material (RAM), electronic measurement equipment, cables and connectors.

These systems, components and equipment may be configured to communicate within the pre-deployment network and/or with any network device 10, 11 under test (DUT). Accordingly, said systems, components and equipment may themselves be configured to act as a transmitting network device 10 and/or a receiving network device 11, as described above.

According to such an embodiment, the transmitting network device 10 may be at least one of a dedicated Over-the-Air Test and Measurement Equipment, one or more components of the dedicated Over-the-Air Test and Measurement Equipment, an anechoic chamber, a non-anechoic chamber, a measurement chamber, a Virtual Electromagnetic Test Environment, one or more components of the Virtual Electromagnetic Test Environment, or a dedicated Device under Test.

According to an analogous embodiment, the receiving network device 11 may be at least one of a dedicated Over-the-Air Test and Measurement Equipment, one or more components of the dedicated Over-the-Air Test and Measurement Equipment, an anechoic chamber, a non-anechoic chamber, a measurement chamber, a Virtual Electromagnetic Test Environment, one or more components of the Virtual Electromagnetic Test Environment, or a dedicated Device under Test.

As described above with reference to the Figures, the network devices 10, 11 may be configured to perform various types of cooperative tests within a deployed network. According to a further example, however, the network devices 10, 11 may also perform these one or more cooperative tests within the pre-deployment network under test. Accordingly, the network devices 10, 11 may be configured to perform tests in a deployed network in situ and/or in a pre-deployment network in a test environment.

According to this embodiment, the transmitting network device 10 may be configured to transmit the one or more control signals 13 via the control channel 12 to the receiving network device 11 for configuring the receiving network device 11 for the characterization by performing a cooperative Over-the-Air End-to-End test between the transmitting network device 10 and the receiving network device 11 for testing the transmitting network device 10 and/or the receiving network device 11 and/or the wireless communication network, wherein said cooperative Over-the-Air End-to-End test may comprise at least one of a pre-deployment test, a design test, a calibration test, a development test, a production test, a qualification test, an assessment test, a conformance test, or a type approval test.

According to an analogous embodiment, the receiving network device 11 may be configured to receive the one or more control signals 13 via the control channel 12 from the transmitting network device 10 for configuring the receiving network device 11 for a characterization by performing a cooperative Over-the-Air End-to-End test between the receiving network device 11 and the transmitting network device 10 for testing the receiving network device 11 and/or the transmitting network device 10 and/or the wireless communication network, wherein said cooperative Over-the-Air End-to-End test comprises at least one of a pre-deployment test, a design test, a calibration test, a development test, a production test, a qualification test, an assessment test, a conformance test, or a type approval test.

As mentioned before, the transmitting network device 10 may be configured to perform such tests in a pre-deployment network.

According to this embodiment, the transmitting network device 10 may be configured to perform the cooperative Over-the-Air End-to-End test in a pre-deployment wireless communication network under test, wherein the transmitting network device 10 and/or the receiving network device 11 and/or the pre-deployment wireless communication network under test is tested before being deployed and/or installed and/or used.

According to an analogous embodiment, also the receiving network device 11 may be configured to perform such tests in a pre-deployment network.

According to this embodiment, the receiving network device 11 may be configured to perform the cooperative Over-the-Air End-to-End test in a pre-deployment wireless communication network under test, wherein the receiving network device 11 and/or the transmitting network device 10 and/or the pre-deployment wireless communication network under test is tested before being deployed and/or installed and/or used.

Additionally or alternatively, the transmitting network device 10 may be configured to perform such tests in a deployed wireless communication network in situ.

According to this embodiment, the transmitting network device 10 may be configured to perform the cooperative Over-the-Air End-to-End test in a deployed wireless communication network in situ.

According to an analogous embodiment, the receiving network device 11 may be configured to perform the cooperative Over-the-Air End-to-End test in a deployed wireless communication network in situ.

With respect to the plurality of embodiments as described above, the invention may also concern an appropriately configured and equipped Over-the-Air Test and Measurement System for one or more network devices 10, 11 within a wireless communication network (e.g. deployed network and/or pre-deployment network) with the features of the appended claims.

Summarizing, the present invention has the following advantages:

i. The invention enables testing during production, sub-assembly, assembly, system integration, deployment, commissioning, operation, maintenance, calibration and optimization.

ii. The invention enables testing in anechoic, non-anechoic, virtual electromagnetic and real world environments (in situ).

iii. The invention facilitates the means to measure and test complete and partially complete communication systems in virtual electromagnetic environments.

iv. The invention provides the means for the OTA measurement and testing of both the transmission and reception functions of the entities and component parts of the communication system.

v. The invention ensures that all entities and component parts of the OTA T&M system have an a priori knowledge of the test signals, test cases and protocols. This allows measurements to be made in all of the herein described scenarios, for example in anechoic and non-anechoic environments and in both pre-deployment and deployment scenarios.

vi. The invention allows deployed networks to be configured for inward looking (self-test) and outward looking (E2E test) measurements.

vii. The invention removes the need for the hierarchical or layered distribution and management of control information.

viii. The invention facilitates the means for autonomous or partly-autonomous OTA measurements and tests to be made by one or more entities or component parts of a communication system.

ix. The invention offers the means of performing OTA measurements and tests using measurement equipment that is simpler and less expensive than traditional base station and user equipment emulators.

x. The invention provides the means to execute diagnostic OTA measurements and tests across various RANs, MNOs, network elements, interfaces, layers and protocols.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] M. Kottkamp and C. Rowell, "Antenna Array Testing—Conducted and Over the Air: The Way to 5G," November 2016. [Online]. Available: http://www.rohde-schwarz.com/appnote/1MA286.
[2] R. K. Sharma, W. Kotterman, M. H. Landman and et al., "Over-the-Air Testing of Cognitive Radio Nodes in a Virtual Electromagnetic Environment," *International Journal of Antennas and Propagation*, vol. vol. 2013, no. Article ID 945283, pp. 1-16, 2013.
[3] P. S. H. Leather and J. D. Parsons, "Antenna measurement systems". US Patent 2006/0055592 A1, 16 Mar. 2006.
[4] 3GPP Technical Report TR 22.819, "Technical Specification Group Services and System Aspects, Feasibility Study on Maritime Communication Services over 3GPP system, Stage 1, Release 16", May 2018. Available: http://www.3gpp.org/DynaReport/22819.htm
[5] 3GPP Technical Report TR 38.811, "Technical Specification Group Radio Access Network, Study on New Radio (NR) to support non terrestrial networks, Release 15", December 2017. Available: http://www.3gpp.org/DynaReport/38811.htm

The invention claimed is:

1. A network device for use in an Over-the-Air End-to-End test within a deployed wireless communication network,
  wherein the network device is configured to perform a cooperative End-to-End test in cooperation with at least one further network device, wherein said at least one further network device is one of several devices participating in the cooperative End-to-End test,
  wherein the network device is configured to orchestrate said cooperative End-to-End test by transmitting one or more control signals via a control channel to each one of the several participating devices for cooperatively performing the cooperative End-to-End test,
  wherein said cooperative End-to-End test comprises a measurement of
    at least one characteristic of the network device and/or of the at least one further network device, and/or
    at least one characteristic of a communication channel between the network device and the at least one further network device,
  wherein the network device and the at least one further network device are configured to perform the cooperative End-to-End test in-situ when they are used in a deployed network.

2. The network device of claim 1, wherein said at least one characteristic of the network device and/or of the at least one further network device, or
  wherein said at least one characteristic of the communication channel between the network device and the at least one further network device comprises at least one of:
    a performance of the network device and/or of the at least one further network device,
    a performance of the communication channel between the network device and the at least one further network device,
    a throughput,
    a reliability,
    a latency,
    a spectral efficiency,
    an energy efficiency, and
    an interference.

3. The network device of claim 1, wherein the cooperative End-to-End test comprises an assessment test
  for assessing said at least one characteristic of the network device and/or of the at least one further network device, and/or
  for assessing said at least one characteristic of the communication channel between the network device and the at least one further network device.

4. The network device of claim 3, wherein said assessment test comprises performing a plurality of measurements and combining their results
  to make an assessment of said at least one characteristic of the network device and/or the at least one further network device, and/or
  to make an assessment of said at least one characteristic of the communication channel between the network device and the at least one further network device.

5. The network device of claim 1, wherein the network device is configured to control an operation and/or a configuration of itself and/or of the at least one further network device by means of the one or more control signals transmitted to the at least one further network device via the control channel for performing the cooperative End-to-End test.

6. The network device of claim 1, wherein the network device is configured to instruct the at least one further network device, by means of the one or more control signals transmitted via the control channel, to do at least one of:
  operating in a certain mode,
  performing a certain action,
  performing a certain test procedure,
  performing a certain measurement procedure for determining the at least one characteristic of the network device and/or of the at least one further network device, and
  performing a certain measurement procedure for determining the at least one characteristic of the communication channel between the network device and the at least one further network device.

7. The network device of claim 6, wherein each of the certain mode, the certain action, the certain test procedure and the certain measurement procedure is referring to an outcome in terms of a metric or an effect,
  while the actual doing (=performing/operating) to obtain the outcome is determined by the implementation of the network device and/or of the at least one further network device.

8. The network device of claim 1, wherein the network device comprises a primary wireless communication interface for communicating with other network devices, and
  wherein the network device is configured to instruct the at least one further network device, by means of the one or more control signals transmitted via the control channel,
    to operate in a receive mode for receiving a signal via the primary wireless communication interface, or to operate in a transmission mode for transmitting a signal via the primary wireless communication interface.

9. The network device of claim 8, wherein the network device is configured to transmit the one or more control signals to the at least one further network device via the control channel for instructing the at least one further network device to operate in a transmission mode and to transmit a signal via the primary wireless communication interface, and
wherein the network device is further configured to receive, via its primary wireless communication interface, the signal from the at least one further network device via the primary wireless communication interface, and to perform a measurement of the received signal for evaluating one or more reception parameters of the received signal.

10. The network device of claim 9, wherein the network device is configured to perform a predetermined action if the one or more evaluated reception parameters are outside a predetermined target range.

11. The network device of claim 8, wherein the network device is configured to transmit the one or more control signals to the at least one further network device via the control channel
for instructing the at least one further network device to operate in a receive mode for receiving a signal from the network device via the primary wireless communication interface, and
for instructing the at least one further network device to perform a measurement of the received signal for evaluating one or more reception parameters of the received signal and to report the result of the measurement to the network device and/or to yet another network device.

12. The network device of claim 1, wherein the network device comprises a primary wireless communication interface for communicating with other network devices,
wherein the network device is configured to transmit the one or more control signals to at least two further network devices via the control channel for performing a download test,
wherein the network device is configured to download predetermined data from each of the at least two further network devices via its primary communication interface.

13. The network device of claim 12, wherein the network device is configured to compare the result of the download test of the at least two further network devices with each other and to select, based on the result of the download test, one of the at least two further network devices for connecting thereto via its primary wireless communication interface.

14. The network device of claim 1, wherein the network device comprises a primary wireless communication interface for communicating with other network devices,
wherein the network device is configured to transmit the one or more control signals to at least two further network devices via the control channel for performing an upload test,
wherein the network device is configured to upload predetermined data to each of the at least two further network devices via its primary communication interface.

15. The network device of claim 14, wherein the network device is configured to compare the result of the upload test of the at least two further network devices with each other and to select, based on the result of the upload test, one of the at least two further network devices for connecting thereto via its primary wireless communication interface.

16. The network device of claim 1, wherein the network device comprises a primary wireless communication interface for communicating with other network devices,
wherein the network device is configured to transmit the one or more control signals to the at least one further network device via the control channel for instructing the at least one further network device
to perform a channel quality test by receiving, via its primary communication interface, predetermined data transmitted from the network device, and to report to the network device an amount and/or a quality of the received predetermined data for evaluating a channel quality of the primary communication interface between the network device and the at least one further network device.

17. The network device of claim 1, wherein the network device comprises a primary wireless communication interface for communicating with other network devices, and wherein the network device is configured to provide the control channel at the primary wireless communication interface.

18. The network device of claim 1, wherein the network device comprises a secondary communication interface for communicating with the at least one further network device, and
wherein the network device is configured to provide the control channel at the secondary communication interface.

19. The network device of claim 1, wherein the network device comprises a secondary external communication interface for communicating with an external device that is configured to communicate with the at least one further network device via a third interface, and
wherein the network device is configured to provide the control channel at the secondary external communication interface.

20. The network device of claim 1, wherein the network device is configured to transmit the one or more control signals to a plurality of further network devices via the control channel.

21. The network device of claim 20, wherein the network device is configured to orchestrate an operation of the plurality of further network devices by transmitting a plurality of same or different control signals via the control channel to the plurality of further network devices at a same time or time interval.

22. The network device of claim 20, wherein the network device is configured to orchestrate an operation of the plurality of further network devices by transmitting a plurality of same or different control signals via the control channel to the plurality of further network devices at a different time or different time intervals.

23. The network device of claim 20, wherein the network device is configured to instruct each of the plurality of further network devices by means of the one or more control signals transmitted via the control channel to do at least one of:
operating in a certain mode,
performing a certain action,
performing a certain test procedure, and
performing a certain measurement procedure
at a same time or time interval for performing the measurement of the at least one characteristic of the network device and/or of the at least one further network device, and/or for performing the measurement of the at least one characteristic of the communication channel between the network device and the at least one further network device.

24. The network device of claim 20, wherein the network device is configured to instruct each of the plurality of further network devices, by means of the one or more control signals transmitted via the control channel, to do at least one of:
operating in a certain mode,
performing a certain action,
performing a certain test procedure, and
performing a certain measurement procedure
sequentially one after another
for performing the measurement of the at least one characteristic of the network device and/or of the at least one further network device, and/or
for performing the measurement of the at least one characteristic of the communication channel between the network device and the at least one further network device.

25. The network device of claim 20, wherein the network device is configured to instruct each of the plurality of further network devices, by means of the one or more control signals transmitted via the control channel, to do at least one of:
operating in a same mode,
performing a same action,
performing a same test procedure, and
performing a same measurement procedure
for performing the measurement of the at least one characteristic of the network device and/or of the at least one further network device, and/or
for performing the measurement of the at least one characteristic of the communication channel between the network device and the at least one further network device.

26. The network device of claim 20, wherein the network device is a functional block having the function of orchestrating the cooperative End-to-End test, and wherein the plurality of further network devices comprises at least one of a base station and a User Equipment.

27. The network device of claim 1, wherein the network device and the at least one further network device are each entities of a same cell or entities of different cells.

28. The network device of claim 1, wherein the network device and the at least one further network device each belong to the same or to different Mobile Network Operators.

29. A network device for use within a wireless communication network,
wherein the network device is configured to perform a cooperative End-to-End test in cooperation with at least one further network device,
wherein the network device is one of several devices participating in said cooperative End-to-End test that is orchestrated by the at least one further network device, wherein one or more of the participating devices receive one or more control signals from said at least one further network device via a control channel for cooperatively performing the cooperative End-to-End test,
wherein said cooperative End-to-End test comprises a measurement of at least one characteristic of the network device and/or the at least one further network device, and/or
at least one characteristic of a communication channel between the network device and the at least one further network device,
wherein the network device and the at least one further network device are configured to perform the cooperative End-to-End test in-situ when they are used in a deployed network.

30. The network device of claim 29, wherein said at least one characteristic of the network device and/or of the at least one further network device, or
wherein said at least one characteristic of the communication channel between the network device and the at least one further network device
comprises at least one of:
a performance of the network device and/or of the at least one further network device,
a performance of the communication channel between the network device and the at least one further network device,
a throughput,
a reliability,
a latency,
a spectral efficiency,
an energy efficiency, and
an interference.

31. The network device of claim 29, wherein the cooperative End-to-End test comprises an assessment test
for assessing said at least one characteristic of the network device and/or of the at least one further network device, and/or
for assessing said at least one characteristic of the communication channel between the network device and the at least one further network device.

32. The network device of claim 31, wherein said assessment test comprises performing a plurality of measurements and combining their results
to make an assessment of said at least one characteristic of the network device and/or of the at least one further network device, and/or
to make an assessment of said at least one characteristic of the communication channel between the network device and the at least one further network device.

33. The network device of claim 29, wherein the network device is configured such that an operation and/or a configuration of the network device is controlled by the at least one further network device responsive to the one or more control signals received via the control channel for performing the cooperative End-to-End test.

34. The network device of claim 29, wherein, responsive to the one or more control signals received via the control channel, the network device is configured to do at least one of:
operating in a certain mode,
performing a certain action,
performing a certain test procedure,
performing a certain measurement procedure for determining the at least one characteristic of the network device and/or of the at least one further network device, and
performing a certain measurement procedure for determining the at least one characteristic of the communication channel between the network device and the at least one further network device.

35. The network device of claim 34, wherein each of the certain mode, the certain action, the certain test procedure and the certain measurement procedure is referring to an outcome in terms of a metric or an effect,
while the actual doing (=performing/operating) to obtain the outcome is determined by the implementation of the network device and/or of the at least one further network device.

36. The network device of claim 29, wherein the network device comprises a primary wireless communication interface for communicating with other network devices, and
wherein the network device is configured to, responsive to the one or more control signals transmitted via the control channel,
operate in a receive mode for receiving a signal via its primary wireless communication interface, or
to operate in a transmission mode for transmitting a signal via its primary wireless communication interface.

37. The network device of claim 36, wherein the network device is configured to, responsive to the one or more control signals transmitted via the control channel,
operate in the receive mode and to receive a signal from the at least one further network device via the primary wireless communication interface,
to perform a measurement of the received signal for evaluating one or more reception parameters of the received signal, and
to report the result of the measurement to the at least one further network device and/or to yet another network device.

38. The network device of claim 29, wherein the network device comprises a primary wireless communication interface for communicating with other network devices, and
wherein the network device is configured to, responsive to the one or more control signals transmitted via the control channel, perform a download test,
in which the network device is configured to provide predetermined data for downloading by the at least one further network device via its primary communication interface.

39. The network device of claim 29, wherein the network device comprises a primary wireless communication interface for communicating with other network devices, and
wherein the network device is configured to, responsive to the one or more control signals transmitted via the control channel, perform an upload test,
in which the network device is configured to receive predetermined data uploaded by the at least one further network device via its primary communication interface.

40. The network device of claim 29, wherein the network device comprises a primary wireless communication interface for communicating with other network devices, and
wherein the network device is configured to, responsive to the one or more control signals transmitted via the control channel, perform a channel quality test by
receiving via its primary communication interface predetermined data transmitted from the at least one further network device and to report to the at least one further network device an amount and/or a quality of the received predetermined data for evaluating a channel quality of the primary communication interface between the network device and the at least one further network device.

41. The network device of claim 29, wherein the network device comprises a primary wireless communication interface for communicating with other network devices, and
wherein the network device is configured to provide the control channel at the primary wireless communication interface.

42. The network device of claim 29, wherein the network device comprises a secondary communication interface for communicating with the at least one further network device, and
wherein the network device is configured to provide the control channel at the secondary communication interface.

43. The network device of claim 29, wherein the network device comprises a third interface for communicating with an external device that is configured to communicate with the at least one further network device via a secondary external communication interface, and
wherein the network device is configured to provide the control channel at the third interface.

44. The network device of claim 29, wherein the network device is configured to, responsive to the one or more control signals transmitted via the control channel, do at least one of:
operating in a certain mode,
performing a certain action,
performing a certain test procedure, and
performing a certain measurement procedure
at the same time or time interval as at least a second network device being one of the several participating devices of the cooperative End-to-End test,
for cooperatively performing the cooperative End-to-End test.

45. The network device of claim 29, wherein the network device is configured to, responsive to the one or more control signals transmitted via the control channel, do at least one of
operating in a same mode,
performing a same action,
performing a same test procedure, and
performing a same measurement procedure
as at least a second network device being one of the several participating devices of the cooperative End-to-End test,
for cooperatively performing the cooperative End-to-End test.

* * * * *

UNITED STATES PATENT AND TRADEMARK OFFICE
CERTIFICATE OF CORRECTION

| | |
|---|---|
| PATENT NO. | : 11,742,961 B2 |
| APPLICATION NO. | : 17/545492 |
| DATED | : August 29, 2023 |
| INVENTOR(S) | : Paul Simon Holt Leather et al. |

It is certified that error appears in the above-identified patent and that said Letters Patent is hereby corrected as shown below:

On the Title Page

(73) Assignee:
Fraunhofer-Gesellschaft zur Forderung der angewandten Forschung e.V., Munich (DE)
Should read:
Fraunhofer-Gesellschaft zur Förderung der angewandten Forschung e.V., Munich (DE)

Signed and Sealed this
Fifteenth Day of October, 2024

Katherine Kelly Vidal
*Director of the United States Patent and Trademark Office*